United States Patent

[11] 3,564,125

[72] Inventor Jack Avins
Princeton, N.J.
[21] Appl. No. 803,544
[22] Filed Mar. 3, 1969
[45] Patented Feb. 16, 1971
[73] Assignee RCA Corporation

[54] TELEVISION INTEGRATED I.F. AMPLIFIER CIRCUITS
17 Claims, 9 Drawing Figs.

[52] U.S. Cl. .......... 178/5.8, 178/5.4; 330/38
[51] Int. Cl. .......... H04n 5/44, H04n 9/00
[50] Field of Search .......... 307/(Inquired); 330/(Inquired), 38, 38 (M) (MI); 178/5.8, 5.8 (A), 5.4

[56] References Cited

UNITED STATES PATENTS 3,009,111 11/1961 Rhodes .......... 178/5.8

OTHER REFERENCES

"An IC Color TV Video IF Facilitates Alignment and Improves AGC" by Brent Welling IEEE Trans. Broadcast and Television Receivers, Vol. BTR-13 pp 24— 33, July, 1967.

*Primary Examiner*—Richard Murray
*Assistant Examiner*—George G. Stellar
*Attorneys*—Eugene M. Whitacre

ABSTRACT: Television receiver arrangement permitting stable operation of monolithic integrated circuit (IC) intermediate frequency (IF) amplifier. A first selectivity network is interposed between the receiver's tuner and a preliminary IF amplifier section, while a second selectivity network is interposed between the preliminary IF amplifier section and a final IF amplifier section. An untuned, wide-band coupling is provided between the output of the final IF amplifier section and the video detector. The preliminary and final IF amplifier sections, the video detector and the untuned amplifier-detector coupling appear in integrated form on the same monolithic IC chip. In color television receiver embodiments, an auxiliary IF amplifier section is interposed between an output of the second selecitivity network and an intercarrier sound detector; the auxiliary IF amplifier section, sound detector, and an untuned, wide-band coupling therebetween also appear in integrated form on the same monolithic IC chip with video detector, etc. In specific color television embodiments, additional functions of video amplification, intercarrier sound IF amplification, AGC potential derivation from video detector output, gain control of preliminary IF amplifier section, AFT drive and RF AGC delay are performed on the amplifier/detector IC chip.

Figure 1:
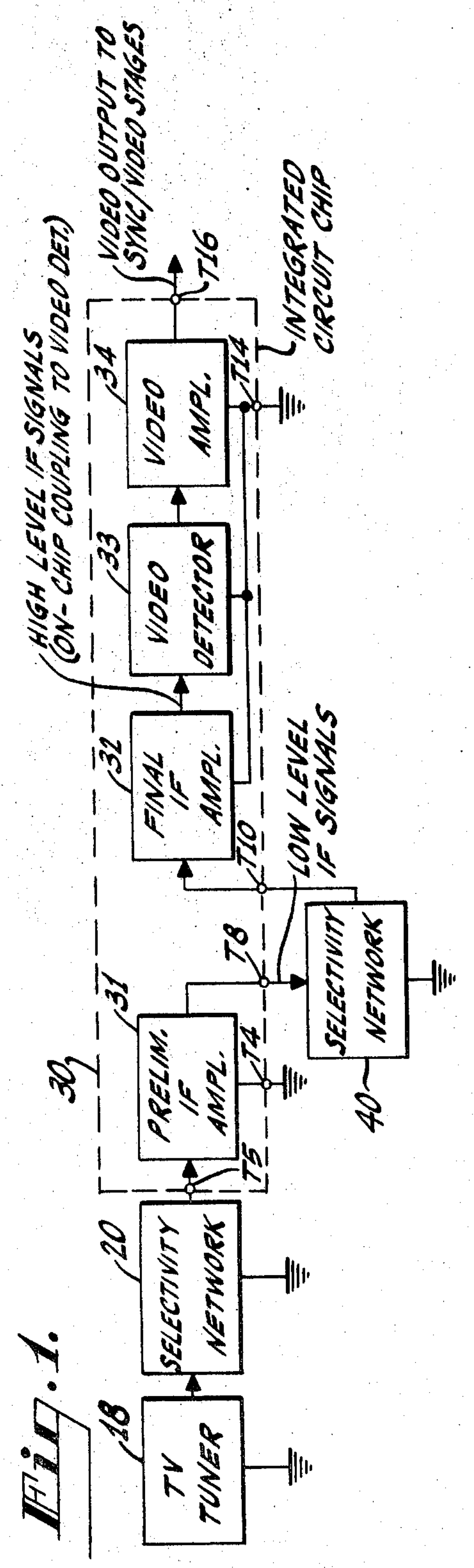

INVENTOR
JACK AVINS

BY William H. Meagher
ATTORNEY

INVENTOR
JACK AVINS
BY William H. Meagher
ATTORNEY

INVENTOR
JACK AVINS

Wm. H. Meagher
ATTORNEY

INVENTOR
JACK AVINS

BY William H. Meagher
ATTORNEY

INVENTOR
JACK AVINS

BY William H. Meagher
ATTORNEY

INVENTOR
JACK AVINS
BY William H. Meagher
ATTORNEY

INVENTOR
JACK AVINS
BY William H. Meagher
ATTORNEY

TELEVISION INTEGRATED I.F. AMPLIFIER CIRCUITS

This invention relates generally to signal amplifiers and, particularly, to amplifier and detector arrangements enabling the successful application of integrated circuit techniques to the performance of such functions as intermediate frequency (IF) amplification in television receivers.

In the standard application of superheterodyne principles to the design of receivers for broadcast video signals, a television receiver is provided with suitable tuner apparatus to select a desired broadcast signal and convert it to intermediate frequencies occupying a predetermined band, and a multiplicity of amplifying stages in cascade for providing the appreciable voltage amplification needed to raise the IF output to the tuner to levels suitable for application to a video detector. Frequency selective networks must be associated with the IF amplifier stages to confine the response of the IF amplifier to the predetermined band, and to establish an appropriate characteristic shape within the band. In the heretofore conventional television receiver arrangement (wherein the respective IF amplifying stages include respective discrete amplifying devices), the function of establishing the desired response characteristic shape is distributed among a plurality of tunable networks serving: (a) to link the initial IF amplifier stage to the tuner; (b) to link each succeeding IF amplifier stage to the preceding stage; and (c) to link the video detector to the final IF amplifier stage.

It is now recognized as advantageous, in many circumstances, to replace discrete signal-handling devices and associated discrete circuit components with monolithic integrated circuit chips (i.e., solid state structures where a plurality of active devices and associated circuit components are simultaneously constructed and interconnected on a common substrate). Use of such monolithic construction techniques offers a number of size, weight and reliability advantages when compared with the assembly of conventional circuit arrangements using discrete devices and associated components. Integrated circuits are particularly well adapted to the processing of signals of the magnitudes encountered in IF amplifiers. The signal-processing function performed by a television IF amplifier thus appears as fertile ground for the useful application of integrated circuit techniques. However, economical application of integrated circuit techniques to the construction of television IF amplifiers has heretofore not appeared to be technically feasible, with the major stumbling block being that of ensuring stability for the resultant IF amplifier.

The IF stability problem is associated with sensitivity, gain, signal frequency and chip dimension requirements, as follows: (1) Sensitivity: The IF amplifier should be capable of responding to signal outputs from the tuner of an extremely low level, e.g. 100 microvolts. (2) Gain: The IF amplifier should deliver to the detector output signals of the order of a volt, and thus must provide gain of the order of 80—90 db. (3) The integrated circuit chip dimensions are so minute (for example, 60 mils × 60 mils) that input and output terminal areas on the chip, and the bonding wires leading from these chip terminal areas, are separated from each other by small fractions of an inch. (4) Signal frequency: The desired IF passband encompasses relatively high signal frequencies; e.g., from approximately 41 MHz. to 46 MHz.

The minute input/output spacing dimensions associated with the chip terminal structures assure sufficient electrostatic and magnetic coupling between output and input terminal areas and associated bonding wires at the operating intermediate frequencies that extraction of IF output signals of the required level from an output terminal area of the requisitely high gain amplifier chip appears to be inevitably associated with feedback levels precluding stable amplifier operation (i.e., feedback of such magnitude as to render likely the sustaining of oscillations at some frequency in the IF band). In view of this situation, workers in the art have heretofore limited the application of integrated circuit techniques to piecemeal or partial integration of the television IF amplifier function (i.e., replacing each discrete amplifying stage with a separate chip, or limiting integration to the initial, low-level portion of the IF amplifier lineup). Such piecemeal or partial use of integrated circuit techniques, however, appears to be economically disadvantageous.

Pursuant to the present invention, departures are made from the conventional television IF amplifier arrangements in such a manner that integration of the television IF amplifier function on a single chip may be achieved with stable amplifier operation assured despite the sensitivity, gain, dimension and frequency requirements listed above. In accordance with the principles of the present invention, the conventional distribution of selectivity networks in the IF amplifier lineup is altered; no tuned circuits are associated with the coupling between stages processing the high level intermediate frequency signals. The video detector is included on the same integrated circuit chip as the high level IF amplifying stages, and coupling of the IF amplifier output signals to the detector is achieved on the chip itself, without use of chip terminal areas or external connections. The picture information signal output from the chip appears in the form of a video frequency signal. As a consequence of such unique arrangements, prudent design of the chip layout enables one to meet the difficult IF amplifier requirements without feedback of a level impairing stability.

Satisfactory band-pass characteristic shaping of the television IF amplifier has proved to be feasible with selectivity networks confined to locations between the tuner and the IF amplifier chip input, and between the output of an initial IF amplifying portion of the chip and the remaining IF amplifying section thereof. Illustratively with such an arrangement, the level of intermediate frequency signals brought out from the chip to terminal areas and external connections may be limited to something on the order of 10 millivolts, which constitutes a safe level from a stability viewpoint for a properly designed chip. It has been found that instability avoidance is aided in the described arrangement by association of the high level IF circuit components of the chip with a separate ground lead on the chip from that associated with the initial IF amplifying chip portion.

In application of the principles of the present invention to color television IF amplifier uses, further departures from conventional practices are established. A troublesome problem presented in the design of color television IF amplifiers is the provision of means for preventing or minimizing the production of a beat between the color subcarrier and the intercarrier sound beat frequency in the video detector output. Illustratively, under U.S. standards where the color subcarrier is approximately 3.58 MHz. and intercarrier beat is 4.5 MHz.; the undesired product falls at 920 kHz. The commercial solution heretofore has been the provision of a separate second detector for production of the desired 4.5 MHz. intercarrier sound IF information, with the input signals for this sound detector derived from the IF amplifier output at a point where the overall band-pass characteristic shaping has provided a favorable picture carrier to sound carrier ratio for good intercarrier sound operation; a network for substantially completely suppressing the sound carrier is interposed between the aforementioned sound takeoff point and the video detector to ensure against 920 kHz. beat production.

Pursuant to the principles of the present invention, no such response alteration is permitted in the coupling between the IF amplifier output and the video detector. Rather, the selectivity network preceding the high-level amplifying stages on the chip performs the sound trapping function, and a takeoff point for information to be supplied to a separate sound detector is provided in the selectivity network ahead of the sound trap. Conveniently, the same integrated circuit chip that provides the high-level IF amplifying stages and the video detector may also incorporate an auxiliary IF amplifier chain which receives signal energy from the aforementioned takeoff and delivers a suitable level input to a sound detector on the same chip. As in the case described above for the video detector, the coupling of high level intermediate frequency signals to the sound detector is achieved on the chip itself without resort to chip terminal areas and external connections. Sound information exits the chip in the form of a 4.5 MHz. intercarrier sound IF signal. Again, by virtue of such unique arrangement, feedback at a level endangering stability is prevented.

In implementing the principles of the present invention, it has been found to be feasible to incorporate the automatic gain control (AGC) function on the same chip with the IF amplifier. This has been facilitated by the incorporation of the video detector, and the consequent appearance of video signals, on the IF amplifier chip.

Illustratively, a particularly successful embodiment of the present invention, suitable for color television receiver use, provides an arrangement, associating a single chip with an array of off-chip passive components, which accomplishes the functions of IF amplification, video detection, video amplification, AGC, sound detection, and sound IF amplification, together with such auxiliary functions as provision of delay for RF AGC, driving of an AFT (automatic fine tuning) circuit and provision of a reference voltage source for a B+ regulator.

The on-chip couplings of IF outputs to the video and sound detectors desirably take the form of DC couplings between amplifier and detector, conserving the chip area devoted to coupling structure.

A primary object of the present invention is to provide novel amplifier and detector arrangements enabling economical application of integrated circuit techniques to the performance of the IF amplification function in television receivers.

A further object of the present invention is to provide novel amplifier and detector arrangements enabling the economical application of integrated circuit techniques to the performance of the IF amplifier, video detector and sound detector functions in television receivers.

Figure 2:
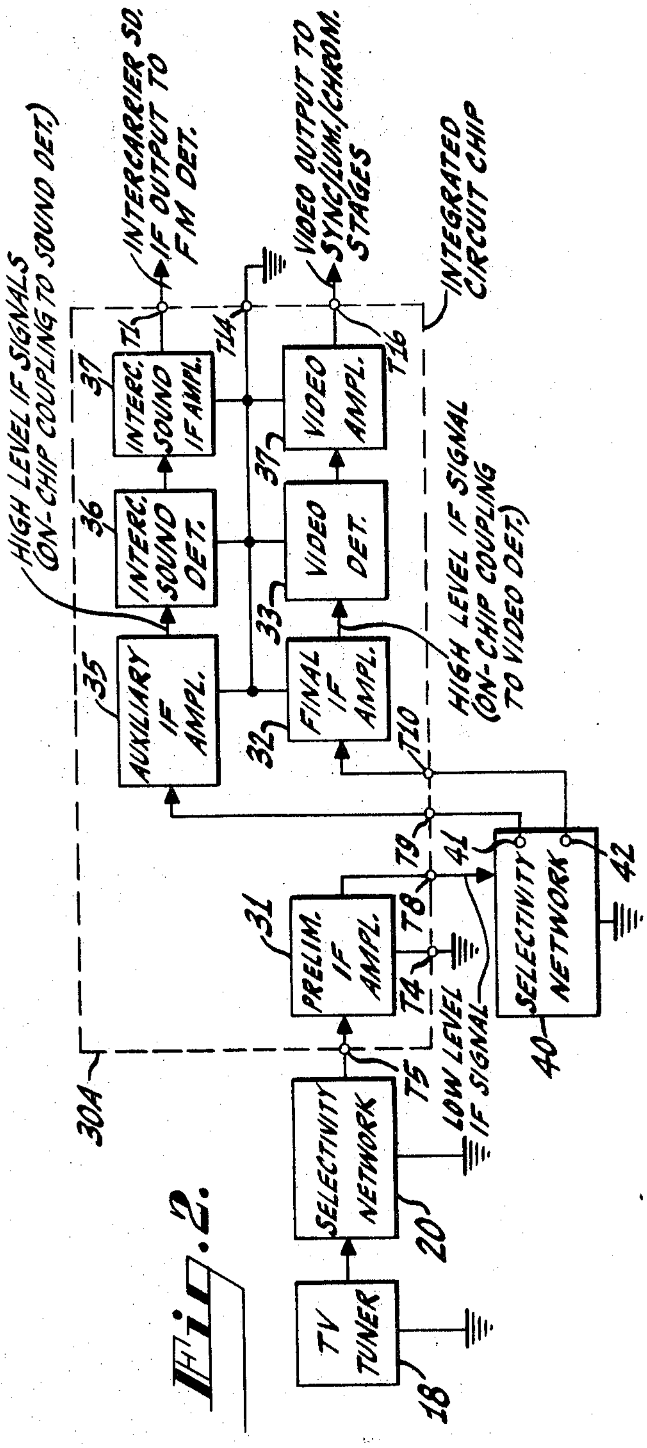
Figure 3:
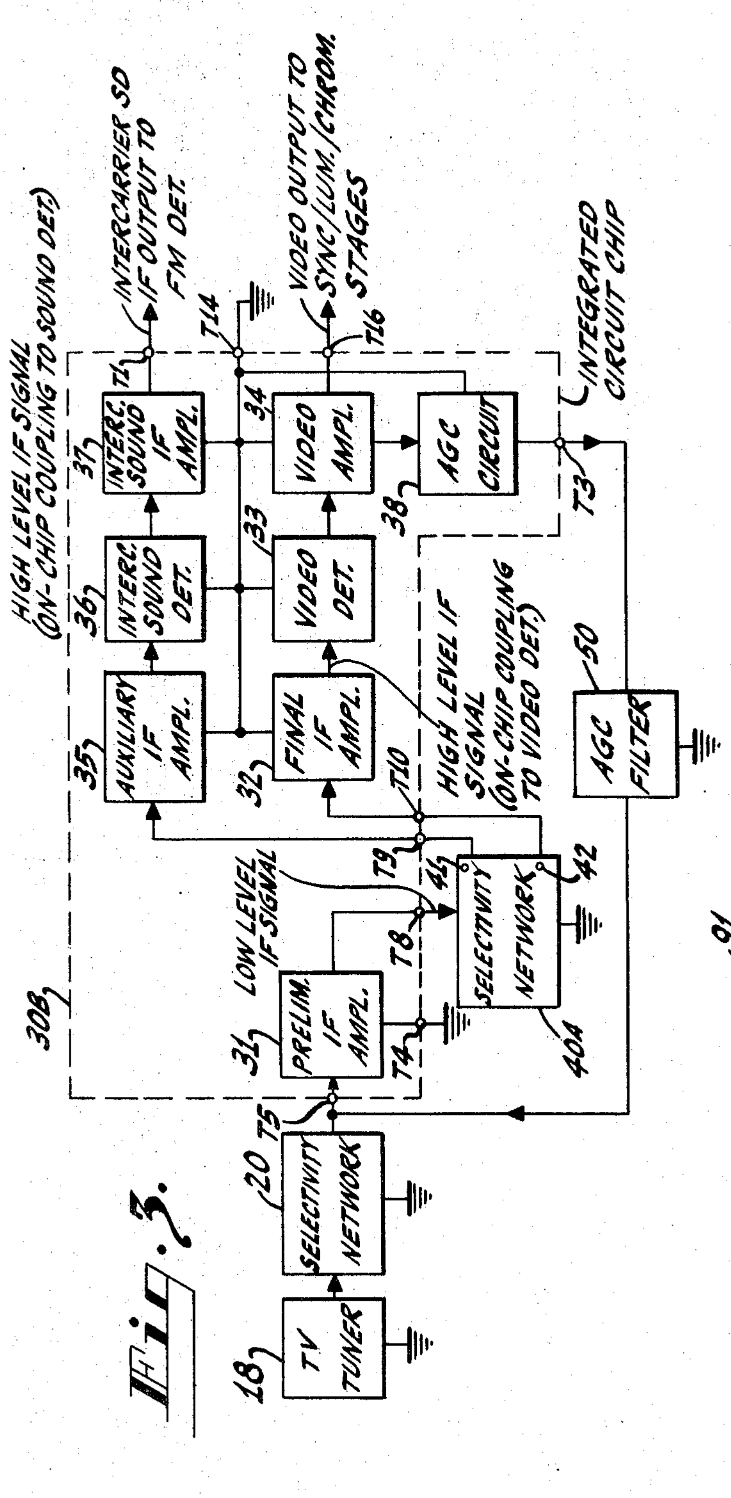
Figure 5:
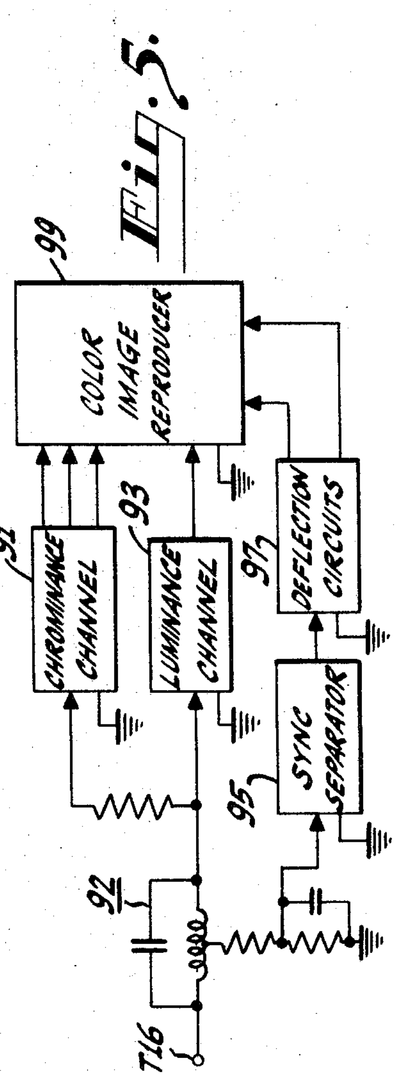
Figure 4:
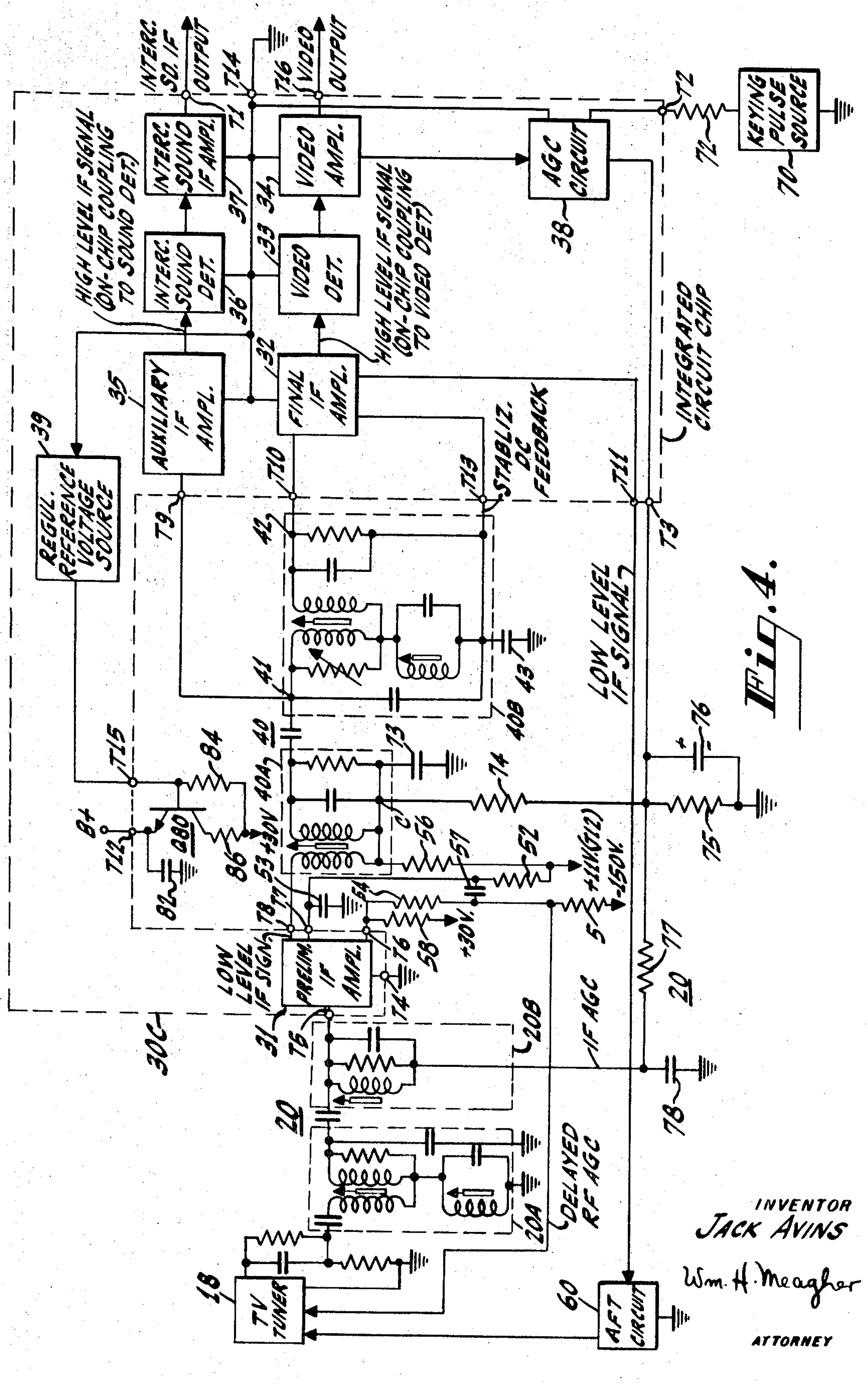
Figure 6:
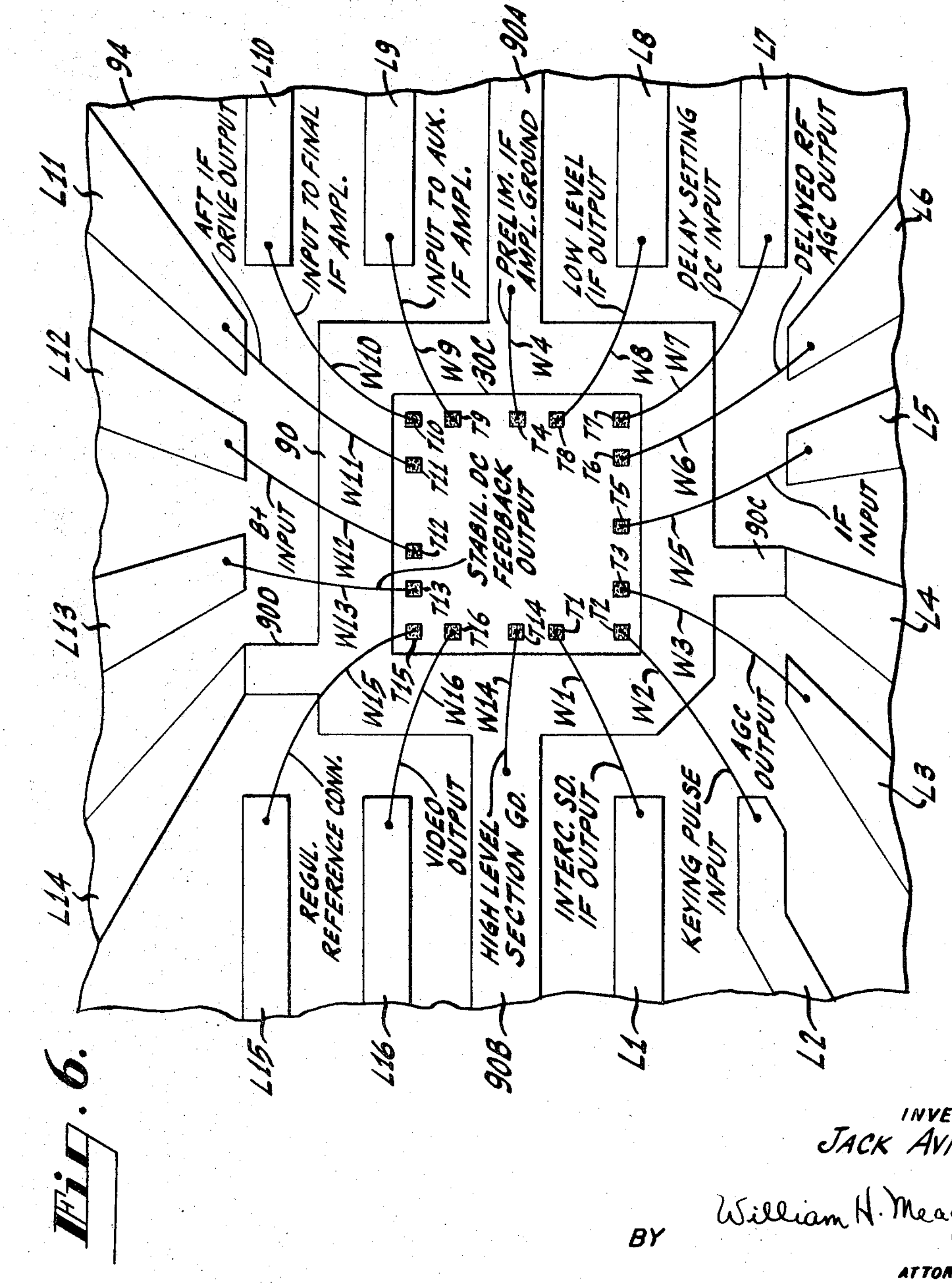
Figure 7:
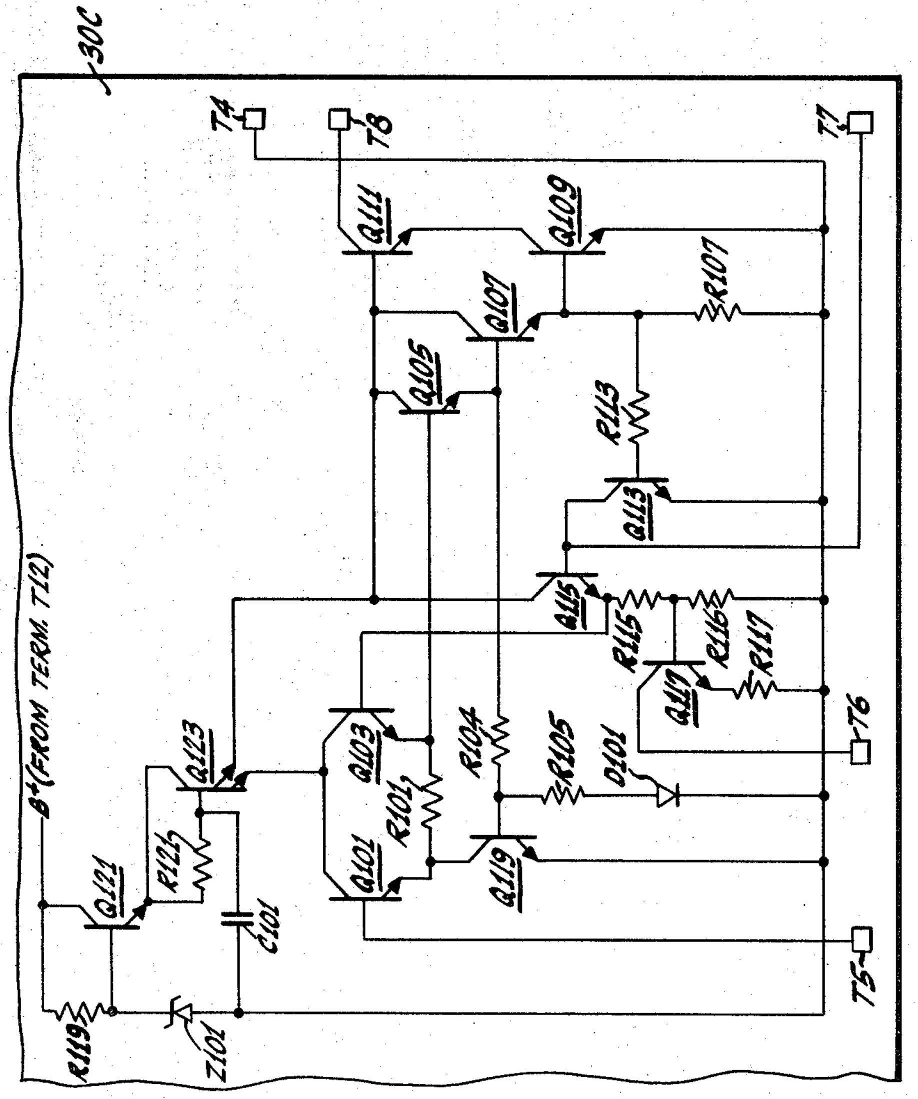
Figure 8:
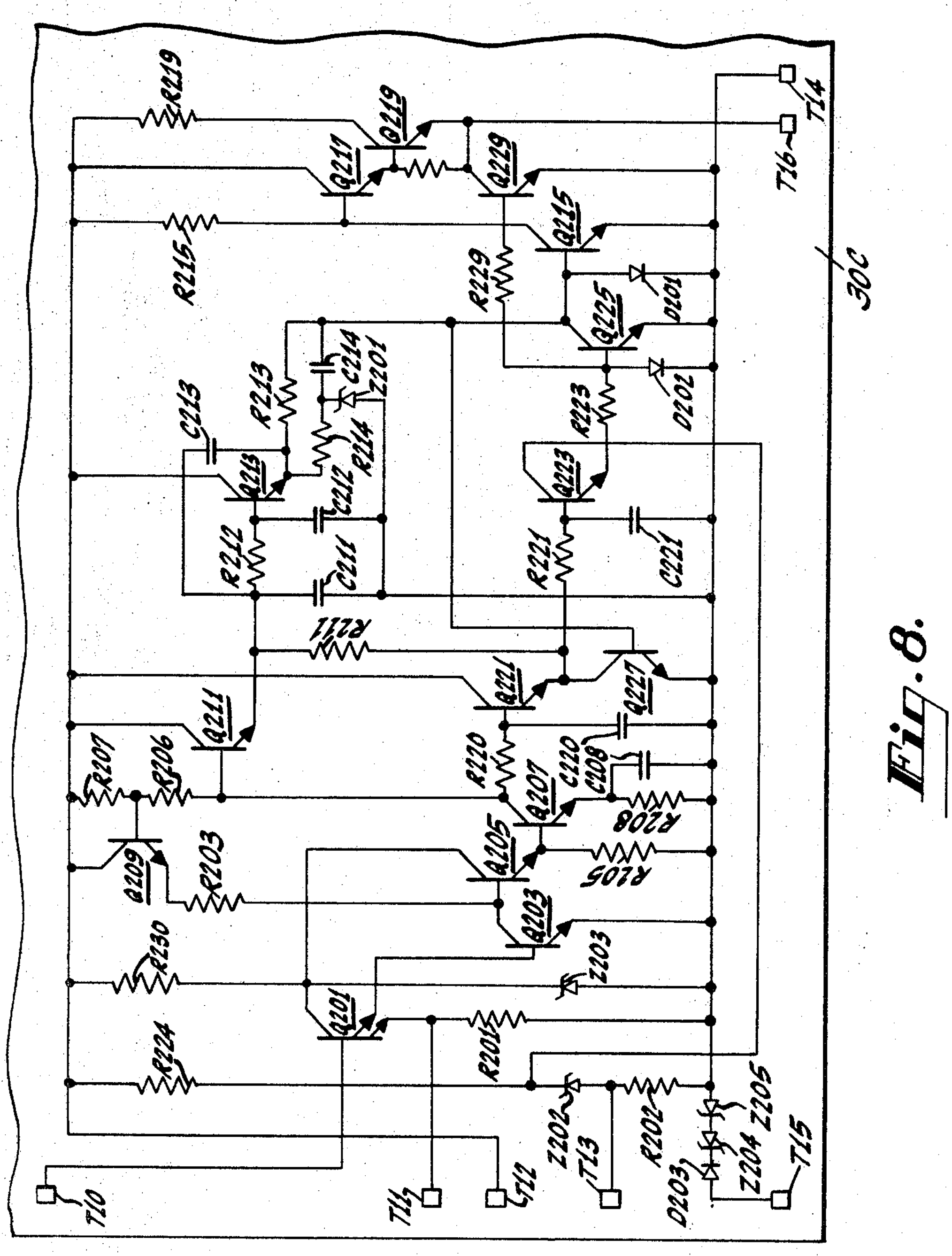
Figure 9:
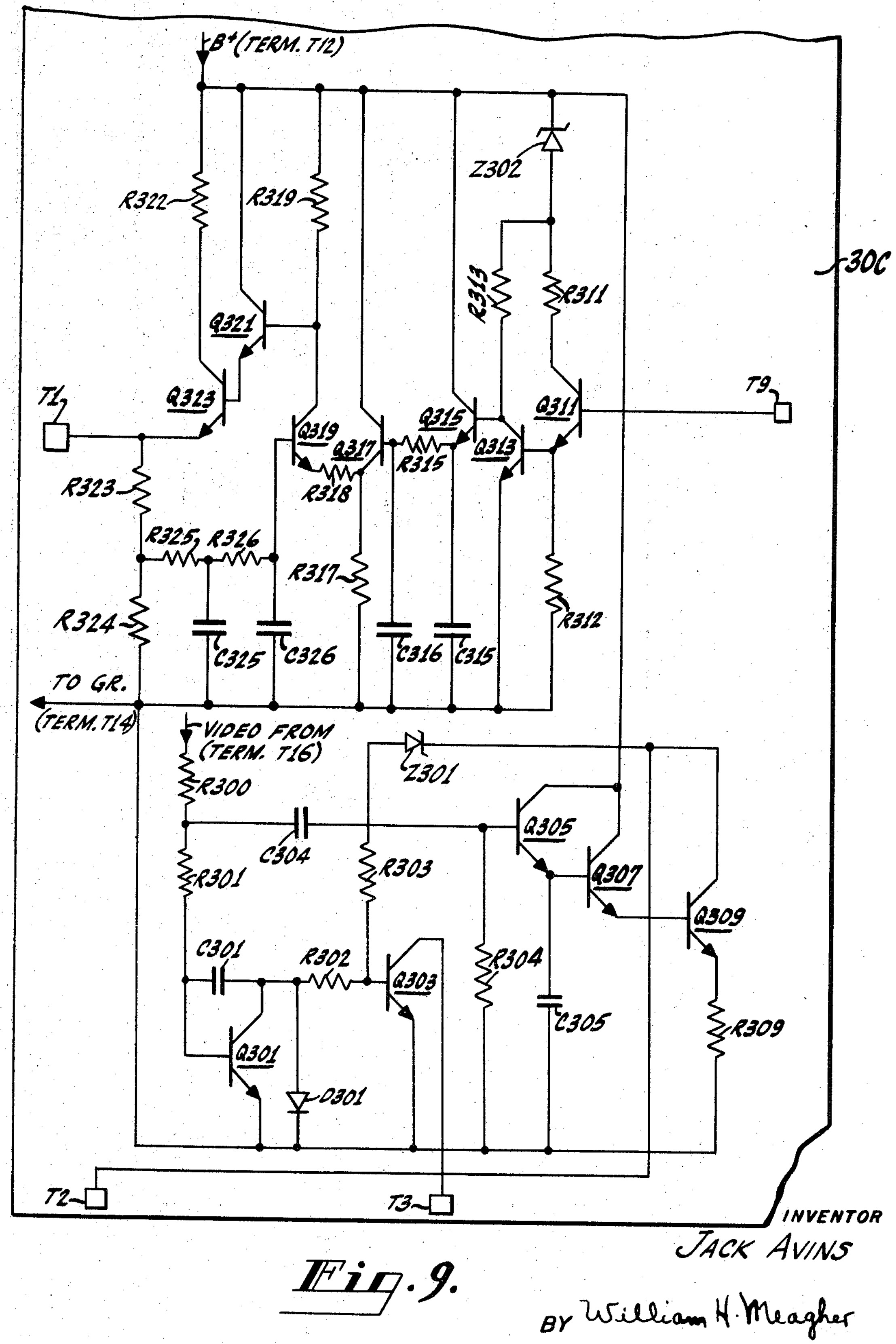

Other objects and advantages of the present invention will be readily apparent to those skilled in the art upon a reading of the following detailed description and an inspection of the accompanying drawings in which:

FIG. 1 provides a block diagram illustration of a portion of a television receiver employing an amplifier and detector arrangement in accordance with the principles of the present invention;

FIG. 2 illustrates in block diagram form a portion of a color television receiver incorporating an amplifier and detector arrangement embodying the principles of the present invention;

FIG. 3 provides a block diagram illustration of a modification of the color television receiver embodiment of FIG. 2;

FIG. 4 illustrates a color television receiver portion, partially in block diagram form but with certain off-chip passive components illustrated in schematic detail, representing a particular modification of the color television receiver embodiment of FIG. 3;

FIG. 5 supplements the illustration of FIG. 4 with a partially schematic, partially block diagram illustration of additional portions of a color television receiver responding to an output of the structure of FIG. 4;

FIG. 6 is an enlarged plan view of an integrated circuit chip and a portion of an associated mount structure, providing an illustrative identification of chip terminal areas and external connections for the integrated circuit element of the FIG. 4 invention embodiment; and FIGS. 7, 8 and 9 provide respective schematic representations of circuitry incorporated in respective portions of an integrated circuit element suitable for use in the FIG. 4 embodiment.

In FIG. 1, a portion of a television receiver embodying the principles of the present invention is illustrated in simplified, block diagram form. A television tuner 18, performing the conventional function of selecting a broadcast video signal and converting this received signal to intermediate frequencies, provides an output which is coupled via a selectivity network 20 to an input terminal T5 of an integrated circuit chip 30. The circuitry of chip 30 includes a preliminary IF amplifier 31, which responds to the signals delivered to terminal T5, and delivers an amplified version thereof to an output terminal T8 of the chip. The signals appearing at terminal T8 are coupled via a second selectivity network 40 to a second input terminal T10 of the integrated circuit chip 30.

The signals delivered to the chip terminal T10 are further amplified in a final IF amplifier section 32 of the integrated circuit. The high-level IF signal output of amplifier 32 is applied via untuned coupling means located on the chip 30 itself to video detector circuitry 33, also incorporated in the integrated circuit chip 30. The output of the video detector 33 is coupled via a video amplifier section 34 of the integrated circuit to a second output terminal T16 of the chip 30. The video output signals appearing at T16 are suitable for application to the various video signal and synchronizing signal channels of the receiver (as well as to the intercarrier sound circuitry, in the case of monochrome receivers).

It will be noted that, in contrast with conventional television receiver practice, the determination of the band-pass character of the television IF amplifier of FIG. 1 is confined to selectivity networks (20 and 40) which precede the development of high-level IF signals in the final IF amplifier section 32. A selectivity network is not used in the coupling of high-level IF signals to the video detector 33; rather, an untuned, on-chip coupling means is provided at this point. It will further be noted that the video detector 33 and video amplifier 34 are incorporated in the same integrated circuit chip with the preliminary and final IF amplifier sections 31 and 32. It can be seen that, as a consequence of the elimination of selectivity network use for high-level IF signal coupling, the incorporation of the noted video circuits on the IF amplifier chip and the provision of on-chip coupling of IF amplifier output to the incorporated video detector, the signals appearing at the output terminals (T8 and T16) of the chip 30 do not include high-level IF signals, but are confined to (*a*) low-level IF signals and (*b*) video signals. Intermediate frequency signals at high levels are confined to the interior of the integrated circuit chip 30 and do not appear at chip terminal areas. As previously discussed, this enables attainment of the requisite high gain in the IF amplifier sections of the chip without degrading the stability of the amplifier. It may be noted that FIG. 1 also illustrates the stability enhancing use of separate on-chip ground leads for the preliminary and final IF amplifier sections 31 and 32. Such use is suggested in the drawing by the showing of separate ground connections from amplifier section 31 and amplifier section 32 to respectively different ground terminals T4 and T14 on the chip 30.

FIG. 2 illustrates a modification of the circuit arrangement of FIG. 1, which modification is of particular utility in color television receivers. In the illustrated color television receiver portion of FIG. 2, receiver elements directly corresponding to those of the FIG. 1 arrangement retain the same reference numeral designation. As in FIG. 1, television tuner 18 supplies an intermediate frequency signal via selectivity network 20 to an input terminal T5 of an integrated circuit chip, here designated 30A because of modification of its contents. Again as in FIG. 1, the integrated circuit chip 30A includes a preliminary IF amplifier section 31, which delivers an amplified version of the intermediate frequency signal input to an output terminal T8 of chip 30A. A selectivity network 40 accepts and processes the signal output from terminal T8 as in FIG. 1, but is here indicated as providing two separate outputs (at respective output network terminals 41 and 42). The network output at terminal 42 is applied to input terminal T10 of the chip 30A, and this signal input to the chip is processed by final IF amplifier section 32, video detector 33 and video amplifier 37 for development of a video signal output at chip terminal T16 in a manner comparable to that described for the FIG. 1 embodiment.

Additionally, a separate selectivity network output appearing at terminal 41 is applied to an additional chip input terminal T9 for delivery to an auxiliary IF amplifier section 35.

An untuned on-chip coupling is provided for supplying the high-level IF signal output of amplifier section 35 to an intercarrier sound detector 36 included on chip 30A. An output of sound detector 36, centered about the 4.5 MHz. intercarrier sound beat frequency, is amplified by an intercarrier sound IF amplifier section 37, also provided on chip 30A, and appears as an intercarrier sound IF signal output at chip terminal T1 for delivery to appropriate FM detection circuitry of the receiver.

The color receiver arrangement of FIG. 2 enables the solution of the previously discussed 920 kHz. beat problem of color television receiver design without loss of the stability ensuring features of the FIG. 1 arrangement. In the FIG. 2 arrangement, the selectivity network 40 includes sound trapping facilities suitably disposed so as to provide severe attenuation of the accompanying sound carrier for the network output appearing at terminal 42. With adequate attenuation of this component, the production by video detector 33 of a disturbing level of the 920 kHz. beat (the result of heterodyning of the 3.58 MHz. color subcarrier and the 4.5 MHz. intercarrier sound beat) may be safely precluded.

Selectivity network 40 is additionally provided with a separate output terminal 41, with the aforementioned sound trapping structure suitably disposed so as to be ineffective with respect to the signals appearing at this latter terminal; the selectivity network 40 provides at terminal 41 a processed intermediate frequency signal with picture carrier and accompanying sound carrier in the appropriate ratio for good intercarrier sound operation. The intermediate frequency signal with such favorable carrier ratio is then amplified in the auxiliary IF amplifier section 35 to the level necessary to drive the detector 36 from which intercarrier sound information will be derived.

It will be noted that this facilitation of proper intercarrier sound operation with 920 kHz. beat elimination in the video channel is accomplished with high-level intermediate frequency signals still confined to the interior of the chip 30A; that is, high-level IF signals are not required to appear at a chip terminal. The chip signal outputs in the FIG. 2 arrangement are restricted to (*a*) low level IF signals at terminal T8, (*b*) video signals at terminal T16 and (*c*) intercarrier sound IF signals at terminal T1. The drawing of FIG. 2 suggests, in a manner similar to that of FIG. 1, the use of an on-chip ground lead for chip sections handling high-level IF signals (here, both the final IF amplifier section 32 and the auxiliary IF amplifier section 35) which is separate from the on-chip ground lead for the preliminary IF amplifier section 31.

FIG. 3 illustrates a modification of the color receiver embodiment of FIG. 2. A major portion of the receiver elements shown in FIG. 3 have comparable functions to receiver elements of FIG. 2, and have accordingly been designated with the same reference numerals. The integrated circuit chip of the FIG. 3 embodiment is provided with an additional circuit function beyond that shown for the chip of FIG. 2, and is designated with the reference numeral 30B. The additional function performed on chip 30B is that of development of an automatic gain control potential from the video output of detector 33. This function is performed by an AGC circuit 38, responding to an output of video amplifier 34. Incorporation of the AGC circuit 38 on the same integrated circuit chip, with the IF amplifier it serves to gain control, is facilitated by the presence on the same chip of the video circuitry 33, 34; i.e., an on-chip coupling of the video information required by the AGC circuit 38 is readily achieved. A DC control potential developed by the AGC circuits 38 appears at chip terminal T3, and is applied via an external AGC filter network 50 to the input terminal T5 for suitable gain control of the preliminary IF amplifier section 31.

An additional output is thus provided by the chip 30B over those listed for the FIG. 2 embodiment. However, it will be readily appreciated that the character of this additional output (a DC potential) does not alter the stability ensuring aspects of the present invention i.e.; addition of the AGC circuit function to the IF chip does not require the appearance of high-level IF signals at a chip terminal.

In FIG. 4, a specific modification of the FIG. 3 arrangement is illustrated, which modification has provided satisfactory operation in color television receiver use. As before, the same reference numerals have been retained for elements providing comparable functions to those shown in FIG. 3. Retained elements on the integrated circuit chip, here designated 30C, include the preliminary IF amplifier section 31, the final IF amplifier section 32, video detector 33, video amplifier 34, auxiliary IF amplifier 35, intercarrier sound detector 36, intercarrier sound IF amplifier 37, and AGC circuit 38. Associated with these retained elements are an array of chip terminals corresponding to those of FIG. 3, i.e., IF input terminal T5, low level IF output terminal T8, auxiliary IF amplifier input terminal T9, final IF amplifier input terminal T10, video output terminal T16, intercarrier sound IF output terminal T1, AGC output terminal T3, and the respective ground terminals T4 and T14.

An additional function provided on the chip 30C is that performed by the regulator reference voltage source 39, which develops a reference voltage for a power supply series regulator incorporating an off-chip transistor Q80. The transistor Q80 accepts (at its collector) via resistor 86 a DC potential input from a power supply (not illustrated) provided elsewhere in the receiver and develops a dynamically regulated output (at its emitter) which is supplied to chip terminal T12 as a B+ voltage for the chip circuits; the reference connection to the base of the regulator transistor Q80 is accomplished via a chip terminal T15, a resistor 84 linking terminal T15 to the unregulated source.

Five additional chip terminals are associated with the integrated circuit chip 30C of FIG. 4, which terminals are concerned with functions not heretofore described. These include a keying pulse input terminal T2, an AFT (automatic fine tuning) IF drive output terminal T11, a stabilizing DC feedback output terminal T13, a delayed RF AGC output terminal T6, and a delay setting DC input terminal T7. Appreciation of functions associated with these additional terminals will follow a subsequent description of the overall operation of the FIG. 4 arrangement. However, it may be noted at this point that the provision of these additional terminals, as well as the regulator and reference terminals T12 and T15, does not disturb the stability-preserving approach heretofore described in connection with simpler invention embodiments. Information appearing at these additional terminals is in a DC form, with the exception of terminal T2, at which a keying pulse appears, and terminal T11, at which low-level IF signals appear. Thus, the additional functions associated with the FIG. 4 chip do not involve the appearance of high-level IF signals at a chip terminal.

In the receiver arrangement of FIG. 4, the output of the television tuner 18 is supplied to the input terminal T5 of the preliminary IF section 31 via a selectivity network 20, which has been illustrated in schematic detail. In the particular illustrated form of network 20, a capacity-coupled, double-tuned pair (20A, 20B) is shown. The input section 20A of the illustrated network 20 comprises a so-called bifilar-T circuit of the type described in my U.S. Pat. No. 3,114,889. In the operation of such a circuit, a cancellation-trapping technique is employed to attenuate an undesired component of the tuner output. Illustratively, the trapping effect is employed in network 20 for attenuation of the adjacent channel sound carrier. In addition to the intermediate signal frequency output of the selectivity network 20, an AGC control potential is also applied to input terminal T5 for effecting gain control functions to be subsequently described in greater detail.

The low-level IF signal output of the preliminary IF amplifier section 31, appearing at terminal T8, is coupled to the input of selectivity network 40. The illustrated form of selectivity network 40 comprises another capacity-coupled, double-tuned pair (40A, 40B) of tuned circuits. Here, the bifilar-T arrangement is employed in the output section 40B. The aforementioned cancellation trapping effect is associated with the accompanying sound carrier in network 40, resulting in severe attenuation of the sound intermediate frequency signal at the network output terminal 42, to which input terminal T10 of the final IF amplifier section 32 on chip 30C is coupled. Network 40 is provided with an additional output terminal 41 at the input to the bilfilar-T section. The intermediate frequency signals appearing at this point are not subject to the aforementioned cancellation trapping effect, and thus are suitable for application to the input terminal T9 of the auxiliary IF amplifier section 35 on chip 30C.

Operations on the input signal at terminal T9 by auxiliary IF amplifier 35, intercarrier sound detector 36, and intercarrier sound IF amplifier 37 are as previously described for the FIG. 2 and 3 embodiments, and result in the production of an intercarrier sound IF output signal at terminal T1. The signals appearing at terminal T10, as in previously described embodiments, are amplified in the final IF amplifier section 32 and delivered via an on-chip, untuned coupling to video detector 33; the video output of detector 33 is amplified in video amplifier 34 and delivered to output terminal T16. In contrast with previously described embodiments, however, additional outputs are derived from the final IF amplifier section 32. One of these outputs comprises a DC potential, responsive to the DC level at the output of section 32, which appears at chip terminal T13 across an external storage capacitor 43. A direct current conductive feedback connection is provided between terminal T13 (via elements of network 40) and the input terminal T10 of the final IF amplifier section 32. The DC potential supplied to terminal T13 is suitably poled so that the feedback connection establishes an operating point stabilizing negative feedback loop. The DC feedback ensures proper signal translation by the active devices of section 32 in the face of manufacturing tolerances and adverse variations in such parameters as temperature, line voltage, etc.

Another function performed within the final IF amplifier section 32 of chip 30C is the provision of a takeoff point for low-level IF signals required by an external AFT circuit 60, such takeoff being suitably isolated from selectivity network 40 (so as to avoid introduction of adverse loading effects on that network). The final IF amplifier section 32 may conveniently incorporate isolating apparatus, such as an emitter follower, for delivering the desired low-level IF signal output to chip terminal T11.

As in the FIG. 3 arrangement, development of an automatic gain control potential in response to the video signals recovered by detector 33 is conveniently effected by an AGC circuit 38 on the same chip 30C. For well-known purposes (associated with the presence of a DC component in the recovered video signal, which DC component varies with picture content), accurate AGC control potential development is desirably a keyed operation, whereby monitoring of the video signal output of the detector is essentially confined to reference signal intervals, such as those occupied by the horizontal synchronizing pulses, which are transmitted at a reference amplitude level independent of picture content. In order to effect keyed operation of the AGC circuit 38 on chip 30C, a keying pulse input terminal T2 is provided on the chip, and coupled to the AGC circuit 38. An external keying pulse source 70 supplies suitably timed keying pulses via a resistor 72 to the chip terminal T2. Illustratively, the keying pulse source 70 may comprise a suitable winding on the flyback transformer employed in the receiver's horizontal deflection circuitry.

As in previously described embodiments, chip terminal T3 serves as an output terminal for the control potential developed by AGC circuit 38, the control potential output varying in magnitude in response to undesired variations in received signal strength. An external AGC filter 50, here schematically illustrated, removes residual video frequency variations from the control potential output. The filtered control potential is then applied via elements of selectivity network 20 to input terminal T5 in order to effect gain variations in the preliminary T5 in order to effect gain variations in the preliminary IF amplifier section 31 in a direction to compensate for the undesired signal strength variations.

It is a conventional practice in television receivers to additionally provide gain control of the RF amplifier portion of the tuner supplying signals to the receiver's IF amplifier. However, it is well recognized as desirable to delay the application of gain control to the RF section relative to the IF amplifier. That is, for received signal strengths in a first range above some nominal level, gain reduction is preferably effected in the IF amplifier only, whereas for signal strength increases beyond that range, gain reduction in both RF and IF amplifiers is desirable. It has been found to be convenient to achieve this RF AGC delay function in association with the operation of preliminary IF amplifier section 31 on the chip 30C. Thus, section 31 incorporates apparatus responding to the AGC input at terminal T5 in such a manner as to repeat its variations at an output terminal T6, but only for AGC input levels exceeding some selected threshold level beyond that at which AGC action in the preliminary IF amplifier is initiated. For convenience in receiver design, a DC input terminal T7 on chip 30C is associated with the RF AGC delay apparatus so as to permit external determination or adjustment of the delay level. In the illustrated receiver arrangement, a fixed delay threshold scheme is shown, with the particular threshold level being determined by the direct current drawn at terminal T7 from the chip B+ source (terminal T12) via an external resistor 52 of a selected value.

The delayed RF AGC output derived from amplifier section 31 at chip terminal T6 is shifted to a DC potential range appropriate to RF amplifier control by a resistor network 54, 55 associated with a negative potential supply (not illustrated) provided elsewhere in the receiver. A direct current conductive connection is provided between the shifting network and tuner 18 to effect the desired RF AGC action.

As in previously discussed embodiments, the preliminary IF amplifier section 31 is shown as associated with a separate ground terminal T4, independent of the ground terminal T14 associated with the final IF amplifier section 32 and other high-level IF signal-processing stages of the integrated circuit chip.

In FIG. 5, a simplified showing is provided for those color television receiver components which may be employed in conjunction with the FIG. 4 structures to provide a complete color receiver. The FIG. 5 apparatus includes a suitable color image reproducer 99, which may comprise, for example, the widely accepted tri-gun, shadow-mask color kinescope. Illustratively, the reproducer 99 responds to signal inputs in the form of a luminance signal supplied by a luminance channel 93, and an array of color-difference signals supplied by a chrominance channel 91. Inputs to the luminance and chrominance channels 91 and 93 are derived from the video output terminal T16 of the integrated circuit chip 30C. Illustratively, the coupling to terminal T16 includes a conventional sound IF rejection filter 92. Also derived from terminal T16, via elements of filter 92, is the input signal for a sync separator 95, which supplies suitable synchronizing information to deflection circuits 97, arranged in conventional manner to effect the raster scanning function required by reproducer 99. As an example of specific color television receiver circuitry with which the present invention may be associated, reference may be made to the RCA CTC 38 chassis, described in the RCA Service Data Pamphlet designated 1968 No. T18.

In FIG. 6, the integrated circuit chip 30C of FIG. 4 is illustrated as mounted in a container of a 16-lead in-line package type, with the top half of the package removed to provide a plan view of the chip 30C, the underlying conductive ground plane 90, the supporting insulator 94, the adjacent ends of the 16 leads (L1 through L16) of a surrounding lead frame and the bonding wires (W1 through W16) which link the bonding pads (chip terminals T1 through T16) of chip 30C to appropriate ones of the package conductors.

As illustrated, the ground plane 90 has a pair of long, side projections 90A and 90B; bonding wire W4 links chip terminal T4 to the ground plane projection 90A, while bonding wire W14 links chip terminal T14 to the ground plane projection 90B. Projections 90A and 90B, at their terminations (not illustrated), contact the conductive casing of the package which serves to shield the enclosed structure. The ground plane 90 has additional short projections 90C and 90D (at bottom and top of drawing) which directly contact leads L4 and L14, respectively. In an illustrative utilization of these leads, the external prong connector to which lead L4 extends is connected to the chassis ground of the receiver, while L14 provides the ground return for the B+ filter capacitor 82 shown at the output of regulator transistor Q80 in FIG. 4.

Application of the IF input signals from the selectivity network 20 of FIG. 4 to chip terminal T5 is effected via lead L5 and bonding wire W5, while the low-level IF output from chip terminal T8 is supplied to the selectivity network 40 via the bonding wire W8 and lead L8. Connection of the selectivity network output terminal 41 to the auxiliary IF amplifier input terminal T9 is provided by lead L9 and bonding wire W9, with the counterpart connection from selectivity network output terminal 42 to the final IF amplifier input T10 provided by lead L10 and bonding wire W10. Intercarrier sound IF output signals are derived from chip 30C by means of the connection provided by lead L1 and bonding wire W1. The sound rejection filter 92 of FIG. 5 derives its video signal drive from chip terminal T16 via bonding wire W16 and lead L16.

The keying pulse input terminal T2 of the FIG. 4 AGC circuit 38 receives keying pulses from source 70 by means of the link provided by lead L2 and bonding wire W2, while the control potential output of AGC circuit 38 is applied to AGC circuit 50 via chip terminal T3, bonding wire W3 and lead L3. The low-level IF signal drive available at chip terminal T11 is supplied to the AFT circuit 60 of FIG. 4 through bonding wire W11 and lead L11. The link provided by lead L13 and bonding wire W13 to chip terminal T13 permits the stabilizing feedback of direct current via selectivity network 40 to the final IF amplifier input terminal T10.

The delay setting DC input current passing through resistor 52 of FIG. 4 is supplied to chip terminal T7 via lead L7 and bonding wire W7, while the delayed RF AGC output of chip 30C is supplied to the shifting network 54, 55 from chip terminal T6 through the external connection provided by bonding wire W6 and lead L6. Connection of the B+ input terminal T12 of chip 30C to the emitter of regulator transistor Q80 is accomplished via bonding wire W12 and lead L12, with the regulator base linked to reference source 39 via lead L15, bonding wire W15, and chip terminal T15.

As a review of the above-listed signal-carrying assignments of the bonding wires and leads will confirm, the stability ensuring approach of the present invention has resulted in the absence of high level IF signals from any of the bonding pads, bonding wires or external leads in the FIG. 6 structure.

FIGS. 7, 8 and 9 comprise schematic representations of a particular arrangement of circuit components that may be provided on the integrated circuit chip 30C for use in the FIG. 4 embodiment. An effort has been made to associate respective schematic showings with regions of the chip layout occupied by the represented circuit components in one particularly successful layout. It will be appreciated that such area association is only roughly depicted, and reflects actual component location on a regional basis only. Thus, for example, FIG. 7 provides a schematic showing of the circuit components located in the lower right portion of the chip 30C as shown in FIG. 6; i.e., that chip portion adjacent to the chip terminals T5, T6, T7, T8 and T4. The circuitry shown in FIG. 7 corresponds to that represented by the preliminary IF amplifier block 31 of FIG. 4. FIG. 8, in turn, presents a schematic showing of the circuitry occupying the upper and left central regions of the chip 30C as shown in FIG. 6; i.e., the circuitry in the vicinity of chip terminals T10, T11, T12, T13, T15, T16, and T14. The circuitry shown in FIG. 8 corresponds to that represented by the final IF amplifier 32, video detector 33 and video amplifier 34 blocks of FIG. 4, and additionally shows the diode chain which comprises the regulator reference voltage source 39 in that FIG. Finally, FIG. 9 provides a schematic showing of the circuitry occupying a lower left region of the chip 30C as shown in FIG. 6 (i.e., the circuitry adjacent chip terminals T1, T2, T3) as well as circuitry extending across the central region of the chip (i.e., between chip terminals T1 and T9). The circuitry shown in FIG. 9 includes that represented in FIG. 4 by blocks labeled auxiliary IF amplifier 35, intercarrier sound detector 36 and intercarrier sound IF amplifier 37 (such circuitry being shown at the top of FIG. 9), as well as that represented by the AGC circuit block 38 of FIG. 4 (such circuitry being shown at the bottom of FIG. 9).

In FIG. 7, the intermediate frequency signals supplied by selectivity network 20 to chip terminal T5 are directly applied to the base of a transistor Q101, disposed as an emitter follower. In lieu of an emitter resistor, the collector-emitter path of a transistor Q119 provides a return to the T4 ground lead from the emitter of Q101 (for reasons to be subsequently described).

The signals appearing at the emitter of transitor Q101 are applied to an attenuator formed by a resistor R101 and the emitter-collector path of a transistor Q103. An attenuated version of the emitter-follower output will appear at the resistor-transistor junction, the degree of attenuation depending upon the impedance presented by the emitter-collector path of transistors Q103. The functioning of this attenuator network will be described in greater detail subsequently.

The attenuator network output is supplied via a pair of emitter-followers (Q105 and Q107) in cascode to the base of a transistor Q109, the output of the cascoded emitter-followers appearing across emitter resistor R107. Transistor Q109 is disposed in a cascode pair arrangement with transistor Q111 to form a high-gain amplifying stage supplying an output to the low level IF output terminal T8. In the cascode pair arrangement, Q109 is a base-input, grounded emitter stage, the collector of which is directly connected to the emitter-input, grounded base stage constituted by transistor Q111. Operating potential for the cascode amplifying stage is supplied from the B+ chip terminal T12 via an external resistor 56 and a coil of the input section of selectivity network 40 (as shown in FIG. 4).

As previously explained, in addition to IF input signals, an AGC control potential is supplied to input terminal T5. By virtue of the direct coupling via emitter-follower Q101, resistor R101 and emitter-followers Q105 and Q107, such AGC input directly affects the bias at the base of transistor Q109 of the cascode pair. The supplied AGC potential variations are poled to provide reverse AGC action; that is, as signal strength increases, the bias voltage at the base of Q109 is made less positive to introduce a desired reduction in the gain of the cascode-amplifying stage.

It has been found to be desirable to provide in addition to the gain variations of the cascode-amplifying stage further aid in gain reduction, and, in particular, further aid of a character to provide, under strong signal conditions, a limitation on the voltage swing supplied to the base of transistor Q109, whereby distortion in that stage may be avoided. It is for such purpose that the previously mentioned R101/Q103 attenuator is provided. Reference may be made to the copending application, Ser. No. 766,905, of Jack R. Harford, entitled "Wide-Band Amplifier," and filed Oct. 11, 1968, now abandoned in favor of a continuation application, Ser. No. 41,755, filed on Jun. 3, 1970, for a detailed discussion of such attenuator networks and their associated advantages.

Control of the attenuator in FIG. 7 is provided in the following manner. A transistor Q113 is provided, deriving its collector potential from an external receiver power supply via an external resistor 52 (as shown in FIG. 4), and with its base responding to the voltage at the base of transistor Q109 by virtue of the connection of resistor R113 between the respective bases. Under no-signal or weak-signal conditions, the base of transistor Q113 is sufficiently forward biased that the transistor is in saturation. Under such saturation conditions, an emitter-follower transistor Q115, having its base directly connected to the collector of transitor Q113 and its emitter returned to ground via resistors R115 and R116 in series, is held off. Transistor Q103, in the previously mentioned attenuator network, has its base directly connected to the emitter of the emitter-follower transistor Q115. Thus, under such no-signal or weak-signal conditions, transistor Q103 is likewise nonconducting, and, as a consequence, a constant, relatively small degree of attenuation is introduced by the R101/Q103 network.

Under strong signal conditions, however, the AGC depression of voltage at the base of transistor Q109 will reach a point at which transistor Q113 will come out of saturation allowing its collector to rise to a level sufficient to forward bias the emitter-follower transistor Q115. The emitter of transistor Q115 thereafter follows the rising base voltage; transistor Q103 will begin to conduct when the emitter of transistor Q115 rises to a positive voltage sufficient to overcome the reverse bias at the emitter of transistor Q103. For signal strengths above the conditions just described, the impedance presented by the emitter-collector path of Q103 will decrease in consonance with signal strength increases to introduce greater and greater degrees of attenuation of the IF signal delivered to the base of transistor Q109.

An additional transistor Q117 is provided for driving the delayed RF AGC output terminal T6. The base of transistor Q117 is directly connected to the junction of the resistors R115 and R116 in the emitter circuit of emitter-follower Q115. The emitter of transistor Q117 is returned to ground via an emitter resistor R117, while the collector of transistor Q117 is linked via chip terminal T6 and external resistor 58 (FIG. 4) to the external +30 volt supply. Under the no-signal and weak-signal conditions which hold transistor Q115 off, transistor Q117 is likewise off.

When, however, signal strength is sufficiently high that emitter follower Q115 conducts sufficiently, the base of transistor Q117 becomes forward biased and transistor Q117 commences conduction. Setting of the threshold of RF AGC delivery may be controlled externally, as by the selection of the value of resistor 52 (FIG. 4) to determine the saturation current of the delay transistor Q113.

For signal levels above the selected threshold level, i.e., for AGC levels beyond that sufficient to remove transistor Q113 from saturation, and in turn render transistors Q115 and Q117 conducting, the voltage at terminal T6 will vary in accordance with the AGC potential at the base of Q107. Shifted to a lower voltage range by the shifting network 54 (FIG. 4), the varying voltage constitutes a suitably delayed AGC potential for RF amplifier control in tuner 18.

It may be noted that, desirably, the delay threshold associated with the RF AGC transistor Q117 is less than the delay threshold associated with the attenuator transistor Q103. That is, RF AGC action is initiated at a lower level of signal strength (as indicated by the AGC potential) than the signal strength level at which attenuator action begins. Indeed, preferably, the full range of RF gain control is traversed before initiation of attenuator action. Thus, for example, in the illustrated circuit, the RF AGC transistor Q117 reaches saturation for a level of voltage at the emitter of transistor Q115 below that associated with the initiation of conduction of attenuator transistor Q103.

It should also be observed that, once attenuator action is commenced by the conduction of transistor Q103, a negative DC feedback loop of relatively high gain is completed. A consequence of such feedback is that the bias at the base of transistor Q109 is held relatively constant in the face of further increases in the AGC potential supplied at terminal T5. Accordingly, the control sequence includes at least three distinct phases. In a first, relatively weak-signal level phase, AGC action is confined to gain variations for the cascode amplifier stage Q109, Q111; for a second medium-signal level phase, gain variations for the cascode amplifier stage are accompanied by RF gain variations; in a third, strong-signal level phase, AGC action is confined essentially to the operation of the attenuator network R101, Q103. Reference may be made to the copending application, Ser. No. 803,728, of Jack R. Harford, filed concurrently herewith on Mar. 3, 1969 and entitled "Automatic Gain Control Systems," for a detailed discussion of such AGC action sequence and advantages thereof.

As previously noted, the collector-emitter path of transistor Q119 provides a return to ground from the emitter of the input emitter-follower transistor Q101. The purpose of the use of transistor Q119 in lieu of an emitter resistor is to provide a relatively constant current supply for the emitters of transistors Q101 and Q103, with the current being of sufficient magnitude as to prevent the current "robbing" (from transistor Q101) by transistor Q103 from limiting the AGC range. That is, in the strong signal mode of operation, when transistor Q103 comes into conduction and draws greater and greater amounts of current, there will be a concomitant reduction of current through transistor Q101. To avoid cutoff of transistor Q101 under such circumstances, the emitters must see an adequate current source. Transistor Q119 serves as such a source, with its base suitably biased to establish a constant current of the desired magnitude. The requisite bias current for supply transistor Q119 is derived from the emitter of the emitter-follower transistor Q105 by a biasing network comprising the series combination of resistor R104, resistor R105 and a forward-biased stabilizing diode D101, with the base of transistor Q119 connected to the junction of resistors R104 and R105. The total resistance value of the series combination is chosen to give a bias current appropriate to set the constant current supply in the desired range. The resistance value of resistor R104 is chosen to be sufficiently large relative to that of resistor R105 to prevent transistor Q119 from introducing any significant degeneration of the AGC potential (in the weak-signal mode).

The circuitry of FIG. 7 additionally includes a decoupling network for supplying operating potentials to a number of transistor devices previously discussed. The B+ voltage (illustratively, 11 volts) available at chip terminal T12 is applied to a simple decoupling network comprising the series combination of resistor R119 and zener diode Z101. While this simple network provides adequate decoupling, the zener diode operation may introduce an undesired level of noise in the voltage appearing thereacross. Accordingly, the voltage across zener diode Z101 is applied via an emitter-follower Q121 to a dynamic noise filter network comprising transistor Q123, resistor R121 and capacitor C101. The collector of transistor Q123 is directly connected to the emitter of transistor Q121. Resistor R121 links the base of transistor Q123 to the emitter of transistor Q121, while capacitor C101 is coupled between the base of transistor Q123 and the T4 ground lead. There is thus available at an emitter electrode of the filter transistor Q123 a relatively noise free B+ potential, adequately decoupled from additional circuits linked to terminal T12. It has been found to be additionally advisable to decouple the collectors of transistors Q101 and Q103 from the collectors of subsequent stages in the FIG. 7 circuitry. To this end, transistor Q123 is constructed in double-emitter form, with a first emitter supplying B+ potential to the collectors of transistors Q101 and Q103, and with a second emitter providing an isolated B+ potential source for the collectors of transistors Q105, Q107, Q109 and Q115. The base of the emitter-input transistor Q111 of the cascode amplifier is also returned to the latter B+ potential source.

In FIG. 8, the IF input terminal T10 (coupled to the output of selectivity network 40 of FIG. 4) is directly connected to the base of a transistor Q201, which is constructed in double-emitter form. Transistor Q201 may thus provide a pair of mutually isolated emitter-follower outputs. One output, appearing across emitter resistor R201, is supplied to chip terminal T11 as a suitable drive for the AFT circuit 60 of the FIG. 4 arrangement. Transistor Q201 thus serves a first purpose of isolating the AFT drive takeoff terminal T11 from the selectivity network 40, to prevent the AFT input circuit from adversely loading the selectivity network. A second function of transistor Q201, associated with its additional emitter, is to supply signals to the base of a collector-output amplifier transistor Q203, constituting what is effectively the second IF amplifier stage. The collector load for the amplifier transistor Q203 includes resistor R203 in series with the emitter-collector path of a feedback transistor Q209 (to be subsequently described).

An emitter follower transitor Q205, provided with an emitter resistor R205, supplies the signals appearing at the collector of transistor Q203 to the base of a second collector-output amplifier transistor Q207 which constitutes the final IF amplifying stage. The collector load for amplifier transistor Q207 includes a pair of resistors R206 and R207 in series. The base of feedback transistor Q209 is directly connected to the junction of resistors R206 and R207. Feedback transistor Q209 serves as an emitter-follower completing a negative feedback loop around the final IF amplifying stage Q207. This feedback loop, in addition to providing transistor Q207 with operating point stabilization in the face of variations of such parameters as temperature and line voltage, serves to dynamically reduce the output impedance presented by the final IF amplifier stage. The feedback stabilizing effect supplements the operating point stabilization afforded to amplifier transistor Q207 by its emitter resistor R208. A corrective phase shift is introduced by a capacitor C208 (shunting resistor R208) to ensure proper phasing of the degenerative feedback.

The IF output appearing at the collector of transistor Q207 is applied to the base of a transistor Q211, which functions as an emitter-follower detector of the IF signal. The detector load includes a capacitor C211, shunted by a resistor R211 in series with the collector-emitter path of a transistor Q227 (providing a function to be subsequently described). An IF filter comprising a series resistor R212 and a shunt capacitor C212 is interposed between the detector load and the base of an emitter-follower transistor Q213.

The detected video signals appearing at the emitter of the emitter-follower transistor Q213 appear across the series combination of resistor R213 and forwardly biased diode D201. The forwardly biased diode D201 is directly in shunt with the base-emitter path of a video amplifier transistor Q215. For video peaking purposes, the resistor R213 is shunted by a series RC network formed by resistor R214 and capacitor C214. A zener diode Z201 is connected between the junction of R214 and capacitor C214 and the T14 ground lead, its function being to limit the charge on capacitor C214, in order to prevent charge buildup on filter capacitor C212 under impulse noise conditions. An additional peaking effect is provided by a capacitor C213 coupled between the emitter of the detector transistor Q211 and the emitter of the emitter-follower transistor Q213. Effectively, high frequency video signals are bypassed around the IF filter to reduce the high frequency roll-off effects introduced by the filter.

The video-amplifying stage constituted by transistor Q215 is of the unusual configuration particularly described in the copending application of Steven Steckler, Ser. No. 772,245, filed Oct. 31, 1968 now abandoned in favor of a continuation Ser. No. 866,122, filed Oct. 8, 1969. In such a configuration, wherein signals together with a unidirectional biasing current are fed via a resistor to a diode poled the same as the base-emitter diode of a transistor and directly in shunt therewith, a linear amplifier with large dynamic output range capability is provided. The output may conveniently be referenced to a desired DC potential, and the gain of the stage is essentially determined by a resistor ratio, independent of variations in the transistor characteristics.

As recognized in the copending application of A. Limberg, Ser. No. 803,804 entitled "Signal Translating Circuit" and filed concurrently herewith, restrictions on the realization of the full dynamic range capability, and consequent limitations on the realized gain, may be encountered in uses of the aforementioned Steckler configuration, where the direct current accompanying the desired signals in the base input circuit exceeds that required to obtain the optimum operating point for the particular signal-processing operation desired. In the particular video amplifier use in FIG. 8, it is desired that essentially the full dynamic output swing capability (i.e., from B+ down to several $V_{be}$) be utilized, with the ratio of collector resistor R215 to input resistor R213 chosen for optimum gain under the anticipated detector output level conditions. To this end, it would be desirable if the no-signal bias current were such as to place the base-emitter diode of Q215 on the brink of conduction, whereby the no-signal collector-operating point would be at the B+ limit, and essentially the full dynamic output range could be filled by signal output. Assurance that such a precise magnitude of bias current will flow through resistor R213 under all operating circumstances and in a reproducible chip-by-chip manner is essentially unattainable. However, the aforementioned Limberg application proposes a bias canceling circuit arrangement whereby the desired biasing conditions may be obtained despite such uncertainty with respect to the R213 current.

Pursuant to use of the Limberg proposals, the circuitry of FIG. 8 includes a transistor Q225, the collector-emitter path of which is directly shunted across the diode D201. Directly shunted across the base-emitter diode of transistor Q225 is an additional diode D202. It can be shown that if diode D202 is constructed as a transistor of the same configuration as Q225 but with collector shorted to base, and a given amount of biasing current forwardly biases diode D202, the collector of transistor Q225 will be constrained to draw a corresponding amount of current with such constraint holding in the face of temperature variations. It will be seen that if the same biasing current is caused to flow through diode D202 as is available via resistor R213, essentially the entire R213 current will be caused to flow through the collector-emitter path of transistor Q225, preventing excess, range-limiting bias current from flowing in diode D201 and the base-emitter diode of the video amplifier transistor Q215.

In order that the aforementioned control of current through diode D202 may be effected, an arrangement employing emitter-follower transistors Q221 and Q223 is provided in the FIG. 8 circuit. The base of emitter-follower transistor Q221 is connected to the collector of the final IF amplifier transistor Q207 by means of a resistor R220. The resistor R220 cooperates with a capacitor C220, connected between the base of transistor Q221 and the T14 ground lead, to form an intermediate frequency filter, precluding signal detection by transistor Q221. Neglecting for the moment the slight voltage drop across resistor R220, the no-signal bias potential at the emitter of the emitter-follower transistor Q221 should closely match the no-signal bias potential at the emitter of the detector transistor Q211, and should track therewith in the face of variations in such parameters as temperature and B+ potential. The emitter of transistor Q221 is linked to diode D202 by a direct current conductive path comprising, in series, a resistor R221, the base-emitter path of the emitter-follower transistor Q223 and resistor R223. With resistors R221 and R223 chosen to be of substantially the same value as resistors R212 and R213 in the detector output path, it will be recognized that the current through diode D202 can be closely matched with that flowing through resistor R213 under no-signal conditions. Moreover, assuming that the construction of transistors Q221 and Q223 matches the construction of transistors Q211 and Q213 with the accuracy achievable in integrated circuit fabrication, the close matching can be readily maintained under varying temperature and B+ conditions.

As noted in the copending application of Jack R. Harford, Ser. No. 803,920 entitled "Detector Circuits" and filed concurrently herewith, it is desirable for detector efficiency to provide a forward biasing current through the emitter-follower detector Q211; however, for optimum detector performance, the biasing current should not exceed that necessary to bias the detector diode to the knee of its characteristic. Pursuant to the biasing principles of the Harford application, a resistor R211 is connected between the emitter of detector transistor Q211 and the emitter of emitter-follower transistor Q221. As previously noted, the potentials at the respective emitters will only slightly differ. The value of resistor R211 is chosen so that for the anticipated range for such potential difference in the manufacture of successive chips, the resultant no-signal bias current will fall within the "knee" limit (illustratively, a resultant bias current of the order of 5 to 50 microamperes).

As further observed in the aforementioned, concurrently filed Harford application, the possibility arises in the use of the above-described biasing scheme that, under conditions of detection of a large signal, the emitter-follower transitor Q221 may be reverse biased. To preclude such an event, the previously mentioned transistor Q227 is provided, with its collector-emitter path connected between the bottom of resistor R211 (i.e., the emitter of transistor Q211) and the T14 ground lead. The base of transistor Q227 is directly connected to the base of the video amplifier transistor Q215. The impedance of the collector-emitter path of Q227 varies inversely with the detected signal, allowing the detector load to accommodate large signals without upsetting the previously described bias current cancellation operation.

The video output signal appearing at the collector of video amplifier transistor Q215 is coupled to the video output terminal T16 via a pair of cascoded emitter-follower stages employing transistors Q217 and Q219. The collector-emitter path of a transistor Q229 is connected between the emitter of the output emitter-follower transistor Q219 and the T14 ground lead. The emitter electrode of the preceding emitter-follower transistor Q217 is returned to the collector of transistor Q229 by an emitter resistor R217. The transistor Q229 effectively constitutes a constant current source for the emitters of transistors Q217 and Q219. Biasing current for the source transistor Q229 is derived from the base of transistor Q225 through a biasing resistor R229 linking the bases of transistors Q225 and Q229. Protection of the output emitter-follower transistor Q219 against adverse terminations at output terminal T16 is afforded by the current-limiting resistor R219, connected between the collector of transistor Q219 and the B+ terminal T12.

As noted in the previous discussion of the FIG. 4 arrangement, it is desirable for operating point stabilization of the devices in the final IF amplifier section 32 to establish a negative DC feedback loop around the amplifier section, and chip terminal T13 is provided on the chip 30C for such DC feedback purposes. The Q221, Q223, Q225 transistor chain, which serves the previously described bias current cancellation function for the video amplifier transistor Q215, facilitates the provision of the desired stabilizing feedback. By virtue of the IF filter R220, C220, the potential at the emitter of the emitter-follower transistor Q221 is a signal-free DC potential indicative of the operating point of the collector of the final IF amplifier transistor Q207. A capacitor C221 cooperates with the series resistor R221 to provide residual signal filtering at the base of the succeeding transitor Q223. By provision of a collector load resistor R224 for the collector of transistor Q223, a well filtered and phase inverted version of the final IF amplifier DC output potential is developed at the collector of transistor Q223. The series combination of a zener diode Z202 and a resistor R202 is connected between the collector of transistor Q223 and the T14 ground lead; chip terminal T13 is connected to the junction of zener diode Z202 and resistor R202. The Z202, R202 network shifts the phase inverted potential to a DC range compatible with application to the final IF amplifier input terminal 10 (via the external connections shown in FIG. 4).

A resistor R230 in series with a zener diode Z203 is connected between the B+ terminal T12 and the T14 ground lead in order to provide across the zener diode a reduced and regulated supply potential for the collectors of the emitter-follower transistors Q201 and Q205. Also included in the FIG. 8 circuitry is a diode chain formed by diode D203 in series with a pair of zener diodes Z204 and Z205, the diode chain linking chip terminals T15 to the T14 ground lead. As illustrated in FIG. 4, chip terminal T15 is directly connected to the base of the regulator transistor Q80, while a resistor 84 links chip terminal T15 to a positive potential supply provided in the receiver. The zener diodes Z204 and Z205 function to maintain a reference potential at the regulator base (with the forwardly biased diode D203 interposed to compensate for the positive temperature coefficients of the zener diodes).

In operation of the circuitry of FIG. 8 in a receiver employing the described FIG. 4 arrangement, the signal swing at the video output terminal T16 will be approximately 7 volts from maximum white to the blacker-than-black sync peaks; i.e., from approximately 8 volts on peak white to approximately .7 volts at sync peaks. It will be seen that the video amplifier circuitry provides good noise clipping action, since noise peaks can drop the output potential no lower than ground potential. Thus, noise is clipped at a level .7 volts beyond sync peaks. However, this noise clipping action will hold only if the AGC function is properly performed in the presence of impulse noise. If the AGC circuitry is permitted to "set up" on impulse noise peaks, the video output level may be improperly reduced, thereby permitting noise to extend more than .7 volts beyond sync peaks. To avoid such adverse performance on impulse noise, the AGC circuitry on chip 30C is provided with noise protection, as will be explained subsequently in conjunction with FIG. 9 of the drawings. For a more detailed explanation of such AGC circuitry, reference may be made to the copending application, Ser. No. 803,590, of Jack R. Harford, filed concurrently herewith on Mar. 3, 1969, and entitled "Automatic Gain Control Circuit."

In the AGC circuitry shown at the bottom of FIG. 9, a pair of resistors R300 and R301, connected in series, provide a DC link between the video output terminal T16 (FIG. 8) and the base of a switching transistor Q301. In the absence of video signals, the connection provides a forward bias rendering the base-emitter path of Q301 conducting. However, it will be observed that no static collector potential is provided for transistor Q301; rather, collector potential is available to transistor Q301 only on a time selective basis and in the form of positive-going keying pulses supplied via chip terminal T2 from external circuitry comprising the keying pulse source 70 and the series resistor 72.

The keying pulses at terminal T2 (desirably wider than horizontal sync pulses) are applied to the collector of switching transistor Q301 by a path including, in series, a zener diode Z301 and a pair of resistors R303 and R302. The zener diode Z301 serves a clipping function, minimizing response to interpulse ripple. Under the normal bias conditions indicated, transistor Q301 will conduct upon occurrence of each keying pulse, reducing the potential at the collector to a potential (e.g., .2 volts) just above the ground potential of the T14 ground lead to which the emitter of transistor Q301 is directly connected.

When video signals are present at the video output terminal T16, the ability of the switching transistor Q301 to conduct during the keying pulse interval will depend upon the magnitude of the video signal during such interval. With the keying pulses from source 70 timed to encompass the horizontal sync intervals of the detected video signals, it will be seen that a given magnitude of detected video signal can preclude conduction by transistor Q301 during a portion of the keying pulse interval. That is, if the video signal magnitude is such that sync peaks drop below the $V_{be}$ level (of approximately .7 volts), the base of transistor Q301 will be insufficiently forward biased during the sync peak to allow conduction in the collector-emitter path of the switching transistor. If, on the other hand, the video signal magnitude is such that sync peaks do not drop below the $V_{be}$ level, conduction in the collector-emitter path of transistor Q301 will be permitted throughout the keying pulse interval.

The consequences of such precluded or permitted conduction by transistor Q301 will now be examined with regard to an additional transistor Q303, the base of which is linked to the junction of the aforementioned resistors R302 and R303, and with regard to a diode D301, which is connected in shunt with the collector-emitter path of transistor Q301 and poled for forward conduction in response to the applied keying pulses. It may first be noted that under signal conditions permitting conduction in the collector-emitter path of transistor Q301, diode D301 is precluded from conducting. That is, such conduction by transistor Q301 reduces the potential difference between anode and cathode of diode D301 to a level below that (i.e., the $V_{be}$ level of .7 volts) necessary to allow diode conduction. The value of resistor R302, linking the collector of transistor Q301 (and anode of diode D301) to the base of transistor Q303, is chosen sufficiently low that the current drawn therethrough by transistor Q301 conduction during a keying pulse interval develops a voltage thereacross of insufficient magnitude (when summed with the .2 volt drop across conducting transistor Q301) to allow conduction by transistor Q303. In contrast, under signal conditions precluding conduction by transistor Q301, the clamping effect of transistor Q301 is removed, diode D301 is permitted to conduct in response to the applied keying pulse, and the .7 volt ($V_{be}$) drop across the conducting diode, in summation with the voltage drop across resistor R302, is of sufficient magnitude to forward bias the base-emitter path of transistor Q303, permitting its conduction.

To appreciate the effect of precluding or permitting the keying on of transistor Q303, consideration must be given to the external circuitry of FIG. 4 associated with the AGC output terminal T3, to which the collector of transistor Q303 is directly connected. As shown in FIG. 4, chip terminal T3 is linked to an intermediate point on a voltage divider formed by a pair of resistors 74 and 75, connected in series between a voltage supply point C and chassis ground. For the purposes of the present discussion, the voltage supply point C, bypassed to ground by capacitor 73 and linked to the B+ chip terminal T12 by dropping resistor 56, may be viewed as a source of substantially fixed DC potential. Between the terminal T3 connection to the junction of resistors 74 and 75 and chassis ground is coupled a storage capacitor 76.

In the absence of conduction by the transistor Q303 linked to terminal T3, capacitor 76 is charged via resistor 74 at a relatively slow rate toward the supply potential at point C. However, whenever transistor Q303 is permitted to be keyed on, the conducting collector-emitter path of transistor Q303 permits discharge of capacitor 76 at a more rapid rate. The potential developed across capacitor 76 is thus seen to be subject to two types of variation: a slow build up of potential in a positive direction occurring during the trace intervals and continuing during the intervening keying intervals whenever transistor Q303 is prevented from being keyed on; and a relatively fast rate reduction of positive potential during those keying intervals when transistor Q303 conduction is permitted.

The long term effect of relatively high or relatively low incidences of keyed conduction periods for transistor Q303 is reflected in the level of a DC potential provided by filtering of the potential across capacitor 76. Resistor 77 and capacitor 78, forming a series combination connected across the capacitor 76, provide the filtering action, with the filtered IF AGC potential appearing at their junction and applied therefrom via network 20 to the IF input terminal T5.

The overall AGC operation will be seen to tend to hold the sync peak level at video output terminal T16 at a potential approximating the $V_{be}$ potential which constitutes the switching threshold for switching transistor Q301. Video signal magnitude increases tending to drive the sync peaks below the $V_{be}$ level will result in cutoff of transistor Q301 during sync peaks, thereby allowing keying pulses to turn on transistor Q303; the consequent discharging of capacitor 76 reduces the (positive) potential applied to terminal T5, which, in turn per the FIG. 7 discussion, will provide a compensating reduction in the IF signals subject to detection. Video signal magnitude decreases which preclude cutoff of transistor Q301 during sync peaks, will bar conduction by transistor Q303 during keying intervals; the resulting uninterrupted charging of capacitor 76 will raise the positive potential applied to terminal T5, and a compensating IF gain increase will ensue.

Lockout prevention is assured in the described AGC system, by virtue of its ability to rapidly develop requisite AGC action from the vertical sync portion of received signals under out-of-sync conditions. The problem of "lockout" is presented, for example, by the switching of a receiver from a weak-signal source to a very strong signal source. Under such illustrative circumstances, a receiver may provide maximum gain processing of very strong signals, leading to stripping of the sync pulses in the video circuits and consequent loss of synchronism of the receiver's deflection circuitry. Without suitable provision for such an eventuality, a keyed AGC system may be unable to develop sufficient AGC action (where there is no synchronous relationship between received sync pulse and deflection-derived keying pulse) to reduce the receiver gain to a level preventing stripping of sync. If such inability prevails, the receiver will be effectively locked out of synchronism.

In the above-described AGC system, during an out-of-sync condition, the lack of coincidence between horizontal sync intervals and the keying pulses from source 70 may prevent the cutoff of transistor Q301 during the horizontal sync intervals, despite a high level of detected video signal. Nevertheless, an AGC action will be initiated during the first vertical sync interval that occurs following loss of synchronism. It will be seen that, under out-of-sync conditions accompanied by strong levels of video signal, the signal peaks at the base of transistor Q301 during the wide vertical sync intervals will hold transistor Q301 off during the entire keying pulse interval. This will result in a succession of relatively large duration conduction periods for transistor Q303. With appropriate choice of parameters determining the discharge current magnitude, such discharge action during vertical sync intervals can be relied upon to rapidly depress the DC potential applied to terminal T5, preventing establishment of the above-described lockout condition.

A consequence of the foregoing design aspects which assure lockout prevention is a concomitant ability of the described AGC system to respond to impulse noise in an adverse manner. That is, impulse noise, producing detected noise pulses which exceed the sync pulses in magnitude, may "fool" the AGC system into an unnecessary depression of the IF amplifier gain, with the resultant production washed out, low contrast pictures when impulse noise is present. As noted previously, such operation of the AGC system will also compromise the noise-clipping action normally obtained in the video circuits, with a resultant possibility of missynchronization of the deflection circuits and still further receiver troubles. Accordingly, the AGC system of FIG. 9 is provided with further circuitry to prevent AGC setup on impulse noise.

The noise protection circuitry includes a normally nonconductive transistor Q309. The collector of transistor Q309 is directly connected to the keying pulse input terminal T2, while the emitter thereof is returned to the T14 ground lead via an emitter resistor R309. The series combination of the transistor Q309 collector-emitter path and resistor R309 represents a load for the keying pulses supplied to terminal T2 that is effectively in parallel with the keyed circuitry heretofore described. Under the normal conditions of nonconduction of transistor Q309, this additional load is of no consequence in determining the current flowing via zener diode Z303 and resistor R303 to the previously described base circuit of transistor Q303. However, should transistor Q309 be biased for conduction, current from the keying pulse source will consequently be diverted away from the Z303, R303 route; if sufficient current is diverted, the voltage available at the base of transistor Q303 during a keying interval will be insufficient to allow its conduction even though the switching transistor Q301 may be cut off.

Transistor Q309 thus constitutes a control facility that may be employed for the desired noise protection. Circuitry is accordingly provided for controlling the biasing of the base of transistor Q309 so that, under impulse noise conditions, when impulse noise peaks may undesirably cut off transistor Q301, conduction by transistor Q303 may be wholly precluded or restricted to reduced discharge current levels per loading of the keying pulse source by transistor Q309. A capacitor C304 coupled between the junction of the video signal conveying resistors R300, R301 and the base of a transistor Q305, and a resistor R304 connected between that base and the T14 ground lead, form a differentiating network. Differentiation of the steep-sided (negative-going) noise pulses that accompany the video signal under impulse noise conditions results in production of a negative-going pulse in response to the noise pulse leading edge and a positive-going pulse in response to the noise pulse-trailing edge.

Transistor Q305, disposed as an emitter follower, serves as a detector of the trailing edge pulse produced by the differentiating network. The detector load comprises a storage capacitor C305, shunted by the direct current conductive impedance presented by the base-emitter path of an emitter follower transistor Q307 (linking the transistor Q305 emitter to the transistor Q309 base), the base-emitter path of the pulse-loading transistor Q309 and the emitter resistor R309. The shunt impedance is made sufficiently large as to provide a time constant for discharge of capacitor C305 that is relatively long, whereby the trailing edge pulses are effectively "-stretched." The detected and stretched trailing edge pulses render transistor Q309 conducting for a limited period following each noise impulse. Thus, under impulse noise conditions when noise pulses falsely cause cutoff of switching transistor Q301, the trailing edges of such noise pulses, upon detection and stretching, will introduce the desired keying pulse attenuation through control of the loading transistor Q309. Off-chip determination of the sensitivity of the noise protection circuit is afforded through control of the effective keying pulse source impedance, as, for example, by selection of the value of coupling resistor 72 (FIG. 4).

The high pass filter character of the C304, R304 network substantially precludes actuation of the keying pulse attenuator system by the lower frequency video signals which represent the bulk of energy distributed in the video signal spectrum. Reliance is placed upon the statistical paucity of high amplitude, high rise rate components in the desired video signal to effectively limit control of the keying pulse attenuator system to undesired noise pulses.

The capacitor C304 (illustratively of a 10 picofarad value) of the differentiating network is conveniently provided on the integrated circuit chip 30C by construction of a diode, suitably poled to be reverse biased in the illustrated circuit. Under abnormal operating circumstances, the reverse bias may be of such magnitude as to cause zener operation of the diode. Under such abnormal circumstances, where the detector transistor Q305 would be effectively DC coupled to the video signal source, the AGC system is secured against lockout by virtue of the disposition of the noise circuit for trailing edge (white going) response.

It should be appreciated that the video output signal at terminal T16, to which the switching transistor Q301 responds, includes a finite level of 4.5 MHz. intercarrier sound beat (despite the severe sound IF attenuation in selectivity network 40). To reduce the possibility of such a component affecting the control of the switching transistor Q301, which desirably should be controlled in response to the lower frequency video signal components that determine sync pulse height, a capacitor C301 is coupled between the collector and base of the switching transistor Q301. Enhancing the inherent input capacity of transistor Q301 by this means improves the low-pass filtering effect provided by that capacity in cooperation with resistor R301.

In the earlier discussion of the charging and discharging of capacitor 76 for AGC purposes, it was assumed that the supply potential at terminal C (FIG. 4) was substantially constant. Actually, however, the potential at this point, which is the collector side of the dropping resistor 56 in the output circuit of the cascode IF amplifying stage (Q109, Q111), will reflect variations in the operating point of that stage. Since such operating point will shift in a positive direction with increasing AGC action, the use of this supply point to derive charging potential for capacitor 76 degenerates AGC action to some extent. Such degeneration, however, is suffered in the illustrated arrangement in order to obtain the benefits of feedback stabilization of the operating points of the cascode amplifier and the emitter followers that drive it. The voltage division ratio associated with resistors 74 and 75 is chosen to establish a bias potential at input terminal T5 appropriately higher than four times the $V_{be}$ potential to afford the desired forward biasing of the stacked base-emitter paths of transistors Q101, Q105, Q107 and Q109 (FIG. 7). The negative DC feedback loop, provided between output terminal T8 and input terminal T5 via resistors 74 and 77, ensures stabilization of the selected biasing against the adverse effects of variations in temperature, line voltage, etc.

The above-described negative DC feedback approach to operating point stabilization is attractive for use in the described chip 30C from the point of view of chip area conservation. However, it should be recognized that where chip area conservation is of less concern, as, for example, in simpler monochrome versions of the present invention (e.g., FIG. 1, where the auxiliary IF amplifier channel is not required), an alternative on-chip scheme for stably biasing the amplifier devices may be preferred to avoid the aforementioned AGC degeneration. Such alternative biasing scheme is shown, for example, in my U.S. Pat. No. 3,366,889, issued Jan. 30, 1968; pursuant to the biasing principles of that patent, bias for the IF amplifying devices may be obtained from a supply incorporating a chain of the appropriate number of forwardly biased diodes constructed on the chip itself.

At the top of FIG. 9 is shown circuitry associated with the sound channel section (elements 35, 36 and 37) of the FIG. 4 arrangement. Chip terminal T9 receives intermediate frequency signals from terminal 41 of the selectivity network 40 of FIG. 4, the signals at terminal 41 not being subject to the sound-trapping action provided in that network for signals delivered to terminal 42. An input emitter-follower transistor Q311 has its base directly connected to chip terminal T9. The collector of transistor Q311 is connected via a current-limiting resistor R311 and a zener diode Z302 to the B+ terminal T12. Zener diode Z302 serves to lower the potential available to the collector of transistor Q311. An emitter resistor R312 is connected between the emitter of transistor Q311 and the T14 ground lead.

The emitter of transistor Q311 is directly connected to the base of a collector-output amplifier transistor Q313. The reduced B+ potential available at the junction of zener diode Z302 and resistor R311 is applied to the collector of resistor Q313 via a collector resistor R313. The amplified signals appearing at the collector of transistor Q313 are applied to the base of a transistor Q315, disposed as an emitter follower, which serves as the intercarrier sound detector. The detector load includes a storage capacitor C315, shunted by the direct current conductive impedance presented by a resistor R315 in series with the base-emitter path of an emitter-follower transistor Q317 and an emitter resistor R317. A capacitor C316 coupled between the base of emitter-follower transistor Q317 and the T14 ground lead cooperates with the series resistor R315 to form an IF filter for the detector output.

The emitter of emitter-follower transistor Q317 is linked via a series resistor R318 to the emitter of a collector-output amplifier transistor Q319. Transistors Q317 and Q319 effectively form a differential amplifier, with a first input in the form of detector output signals applied to the base of transistor Q317, and a second input in the form of a feedback signal (to be subsequently described) applied to the base of transistor Q319. The output of the differential amplifier appears across a load including a collector resistor R319, linking the collector of transistor Q319 to the B+ terminal T12.

A pair of cascaded emitter-followers, constituted by transistors Q321 and Q323, provide an impedance-transforming coupling between the collector output circuit of Q319 and the intercarrier sound IF output terminal T1. A current limiting resistor R322 is provided in the collector circuit of the output emitter-follower transistor Q323. A pair of resistors R323 and R324 are connected between the emitter of the output emitter-follower transistor Q323 and the T14 ground lead. A low-pass filter formed by a pair of series resistors R325 and R326 and a pair of shunt capacitors C325 and C326, couple signals from the junction of resistors R323 and R324 to the base of amplifier transistor Q319. The series resistors R325, R326 complete a negative DC feedback loop around the amplifying stage constituted by transistor Q319 for operating point stabilization. The shunt capacitors C325 and C326 are chosen of suitable values relative to the resistance values of series resistors R325, R326 as to provide low-pass filtering of the signal feedback of a form that effectively peaks the amplifier response for the intercarrier sound beat products of detection (relative to the lower frequency video signal detection products).

In a conventional manner, the external circuitry (not illustrated) to be coupled to output terminal T1 may include the usual high-Q 4.5 MHz. tuned circuit, for selecting the intercarrier sound beat signal to the relative exclusion of accompanying video signals. Examples of beat selection apparatus suitable for coupling to chip terminal T1, as well as examples of IC FM detector arrangements suitable for recovering sound signals from the selected intercarrier sound beat, are provided in my aforementioned U.S. Pat. No. 3,366,889, and in my U.S. Pat. No. 3,355,669, issued Nov. 28, 1967. Reference may also be made to the latter patent for a general understanding of techniques that may be applied in the actual construction of monolithic integrated circuits of the type herein described.

The schematic circuit details of FIGS. 7, 8 and 9, which have been described above in connection with the schematic circuit details of the off-chip components of FIG. 4 represent a specific application of principles of the present invention. It will be recognized that within the scope of the present invention various departures may be made from the particularly illustrated circuit configurations of chip 30C. Similarly, departures may be made from the particular circuit configurations shown for the off-chip components of FIG. 4. Illustratively, another successful application of the principles of the present invention has been realized in accordance with the general configuration of FIG. 4, but with a different array of tuned circuits within the selectivity networks 20 and 40. In this instance, a third tuned circuit was provided in the selectivity network 20, and a low gain transistor amplifier was interposed in the network to isolate the third tuned circuit from a succeeding tuned pair.

By way of example only, a table of values is presented below for various on-chip components of the circuitry of FIGS. 7, 8 and 9, and off-chip components of the cooperating circuitry illustrated in FIG. 4.

TABLE A: ON-CHIP COMPONENT VALUES

Resistor R101 — 1,000 ohms

Resistor R104 — 2,000 ohms

Resistor R105 — 360 ohms

Resistor R107 — 700 ohms

Resistor R113 — 1,000 ohms

Resistor R115 — 1,600 ohms

Resistor R116 — 3,200 ohms

Resistor R117 — 800 ohms

Resistor R121 — 3,000 ohms

Resistor R201 — 1,400 ohms

Resistor R202 — 4,800 ohms

Resistor R203 — 2,700 ohms

Resistor R205 — 1,000 ohms

Resistor R206 — 400 ohms

Resistor R207 — 1,000 ohms

Resistor R208 — 90 ohms

Resistor R211 — 5,000 ohms

Resistor R212 — 4,000 ohms

Resistor R213 — 1,980 ohms

Resistor R214 — 2,000 ohms

Resistor R215 — 8,000 ohms

Resistor R217 — 1,200 ohms

Resistor R219 — 150 ohms

Resistor R220 — 6,000 ohms

Resistor R221 — 4,000 ohms

Resistor R223 — 2,000 ohms

Resistor R224 — 3,000 ohms

Resistor R229 — 1,000 ohms

Resistor R230 — 1,600 ohms

Resistor R300 — 500 ohms

Resistor R301 — 8,000 ohms

Resistor R302 — 150 ohms

Resistor R303 — 3,000 ohms

Resistor R304 — 8,000 ohms

Resistor R309 — 500 ohms

Resistor R311 — 200 ohms

Resistor R312 — 700 ohms

Resistor R313 — 1,500 ohms

Resistor R315 — 4,000 ohms

Resistor R317 — 1,800 ohms

Resistor R318 — 600 ohms

Resistor R319 — 10,000 ohms

Resistor R322 — 400 ohms

Resistor R323 — 1,800 ohms

Resistor R324 — 3,000 ohms

Resistor R325 — 3,500 ohms

Resistor R326 — 5,000 ohms

Capacitor C101 — 20 picofarads

Capacitor C208 — 10 picofarads

Capacitor C211 — 7 picofarads

Capacitor C212 — 3 picofarads

Capacitor C213 — 6.5 picofarads

Capacitor C214 — 12 picofarads

Capacitor C220 — 8 picofarads

Capacitor C221 — 3 picofarads

Capacitor C301 — 10 picofarads

Capacitor C304 — 10 picofarads

Capacitor C305 — 10 picofarads

Capacitor C315 — 10 picofarads

Capacitor C316 — 5 picofarads

Capacitor C325 — 10 picofarads

Capacitor C326 — 10 picofarads

TABLE B: OFF-CHIP COMPONENT VALUES

Resistor 52 — 100,000 ohms

Resistor 54 — 2,400 ohms

Resistor 55 — 62,000 ohms

Resistor 56 — 1,200 ohms

Resistor 58 — 6,800 ohms

Resistor 72 — 7,000 ohms (for 15 v. pulse)

Resistor 74 — 56,000 ohms

Resistor 75 — 43,000 ohms

Resistor 77 — 3,300 ohms

Resistor 84 — 10,000 ohms

Resistor 86 — 330 ohms

Capacitor 43 — .020 microfarad

Capacitor 53 — .001 microfarad

Capacitor 57 — .100 microfarad

Capacitor 73 — .001 microfarad

Capacitor 76 — 10 microfarads

Capacitor 78 — .100 microfarad

Capacitor 82 — 680 picofarads

I claim:

1. In a television receiver including a source of television IF signals, the combination comprising:

preliminary IF amplifier means responsive to signals from said source for developing a low-level IF signal output at an output terminal thereof;

tuned coupling means having a band-pass characteristic and responsive to the low-level IF signal output of said preliminary IF amplifier means for selectively coupling low level IF signals from said preliminary IF amplifier means output terminal to a coupling means output terminal;

final IF amplifier means having an input terminal coupled to said coupling means output terminal for developing a high-level IF signal output at an output terminal thereof;

a video detector;

an untuned coupling means for applying high-level IF signals from said final IF amplifier means output terminal to said video detector;

said preliminary IF amplifier means, said final IF amplifier means, said video detector and said untuned coupling means all being realized in integrated form on a common, monolithic integrated circuit chip.

2. In a television receiver including a source of television IF signals comprising modulated picture and sound carriers, the combination comprising:

preliminary IF amplifier means responsive to signals from said source for developing a low-level IF signal output at an output terminal thereof;

tuned coupling means, having a band-pass characteristic and responsive to the low-level IF signal output at said preliminary IF amplifier means output terminal, for developing (*a*) a first low-level IF signal output, having a first picture carrier to sound carrier ratio, at a first output terminal thereof, and (*b*) a second low-level IF signal output, having a second picture carrier to sound carrier ratio appreciably greater than said first ratio, at a second output terminal thereof;

final IF amplifier means having an input terminal coupled to said second output terminal of said tuned coupling means for developing a high-level IF signal output;

a video detector;

first untuned coupling means for applying said high-level IF signal output of said final IF amplifier means to said video detector;

auxiliary IF amplifier means having an input terminal coupled to said first output terminal of said tuned coupling means for developing a high-level IF signal output;

an intercarrier sound detector;

second untuned coupling means for applying said high-level IF signal output of said auxiliary IF amplifier means to said intercarrier sound detector; and said preliminary, final and auxiliary IF amplifier means, said video and intercarrier sound detectors and said first and second untuned coupling means being realized in integrated form on a common, monolithic integrated circuit chip.

3. In a color television receiver including a source of color television IF signals comprising modulated picture and sound carriers, the combination comprising:

preliminary IF amplifier means responsive to signals from said source for developing a low-level IF signal output at an output terminal thereof;

tuned coupling means, having a band-pass characteristic and responsive to the low-level IF signal output at said preliminary IF amplifier means output terminal, for developing (*a*) a first low-level IF signal output, having a first picture carrier to sound carrier ratio, at a first output terminal thereof, and (*b*) a second low-level IF signal output, having a second picture carrier to sound carrier ratio appreciably greater than said first ratio, at a second output terminal thereof;

final IF amplifier means having an input terminal coupled to said second output terminal of said tuned coupling means for developing a high-level IF signal output;

a video detector;

first untuned coupling means for applying said high-level IF signal output of said final IF amplifier means to said video detector;

a color image reproducer responsive to the output of said video detector;

auxiliary IF amplifier means having an input terminal coupled to said first output terminal of said tuned coupling means for developing a high-level IF signal output;

an intercarrier sound detector; and second untuned coupling means for applying said high-level IF signal output of said auxiliary IF amplifier means to said intercarrier sound detector.

4. Apparatus in accordance with claim 3 wherein said final and auxiliary IF amplifier means, said video and intercarrier sound detectors and said first and second untuned coupling means being realized in integrated form on a common, monolithic integrated circuit chip.

5. In a color television receiver including a source of color television IF signals comprising modulated picture and sound carriers, the combination comprising:

preliminary IF amplifier means responsive to signals from said source for developing a low-level IF signal output at an output terminal thereof;

tuned coupling means, having a band-pass characteristic and responsive to the low-level IF signal output at said preliminary IF amplifier means output terminal, for developing (*a*) a first low-level IF signal output, having a first picture carrier to sound carrier ratio, at a first output terminal thereof, and (*b*) a second low-level IF signal output, having a second picture carrier to sound carrier ratio appreciably greater than said first ratio, at a second output terminal thereof;

final IF amplifier means having an input terminal coupled to said second output terminal of said tuned coupling means for developing a high-level IF signal output;

a video detector;

first untuned coupling means for applying said high-level IF signal output of said final IF amplifier means to said video detector;

a color image reproducer responsive to the output of said video detector;

auxiliary IF amplifier means having an input terminal coupled to said first output terminal of said tuned coupling means for developing a high-level IF signal output;

an intercarrier sound detector; and second untuned coupling means for applying said high-level IF signal output of said auxiliary IF amplifier means to said intercarrier sound detector; said preliminary, final and auxiliary IF amplifier means, said video and intercarrier sound detectors and said first and second untuned coupling means being realized in integrated form on a common, monolithic integrated circuit chip.

6. In a television receiver including a source of television IF signals, the combination comprising:

preliminary IF amplifier means responsive to signals from said source for developing a low-level IF signal output at an output terminal thereof;

tuned coupling means having a band-pass characteristic and responsive to the low-level IF signal output of said preliminary IF amplifier means for selectively coupling low-level IF signals from said preliminary IF amplifier means output terminal to a coupling means output terminal;

final IF amplifier means having an input terminal coupled to said coupling means output terminal for developing a high-level IF signal output at an output terminal thereof;

video-detecting means for recovering video signals from television IF signals applied thereto;

an untuned coupling means for applying high-level IF signals from said final IF amplifier means output terminal to said video detecting means;

means for controlling the development of an automatic gain control potential reflecting undesired variations in the level of video signals applied thereto;

means for coupling video signals from said video detecting means to said automatic gain control potential development controlling means; and means for rendering said preliminary IF amplifier means additionally responsive to said developed automatic gain control potential so that the gain of said preliminary IF amplifier means varies in a manner tending to compensate for said undesired level variations; said gain-variable preliminary IF amplifier means, said final IF amplifier means, said untuned coupling means, said video-detecting means, said video signal-coupling means, and said automatic gain control potential development controlling means all being realized in integrated form on a common, monolithic integrated circuit chip.

7. In a color television receiver including a source of color television IF signals comprising modulated picture and sound carriers, the combination comprising:

preliminary IF amplifier means responsive to signals from said source for developing a low-level IF signal output at an output terminal thereof;

tuned coupling means, having a band-pass characteristic and responsive to the low-level IF signal output at said preliminary IF amplifier means output terminal, for developing (*a*) a first low-level IF signal output, having a first picture carrier to sound carrier ratio, at a first output terminal thereof; and (*b*) a second low-level IF signal output, having a second picture carrier to sound carrier ratio appreciably greater than said first ratio, at a second output terminal thereof;

final IF amplifier means having an input terminal coupled to said second output terminal of said tuned coupling means for developing a high-level IF signal output;

video-detecting means for recovering video signals from color television IF signals applied thereto;

first untuned coupling means for applying said high-level IF signal output of said final IF amplifier means to said video detector;

auxiliary IF amplifier means having an input terminal coupled to said first output terminal of said tuned coupling means for developing a high-level IF signal output;

an intercarrier sound detector;

second untuned coupling means for applying said high-level IF signal output of said auxiliary IF amplifier means to said intercarrier sound detector;

means for controlling the development of an automatic gain control potential reflecting undesired variations in the level of video signals applied thereto;

means for coupling said recovered video signals from said video detecting means to said automatic gain control potential development controlling means; and means for rendering the gain of said preliminary IF amplifier means variable in response to said developed automatic gain control potential; said gain-variable preliminary IF amplifier means, said final and auxiliary IF amplifier means, said video detecting means, said intercarrier sound detector, said first and second untuned coupling means, said video signal-coupling means and said automatic gain control potential development controlling means, being realized in integrated form on a common, monolithic integrated circuit chip.

8. In a television receiver including tuner apparatus for selecting and converting received television signals to intermediate frequencies, the combination comprising:

a preliminary IF amplifier having input and output terminals;

a final IF amplifier having input and output terminals a video detector;

a first tuned coupling network having a band-pass characteristic and interposed between said tuner apparatus and an input terminal of said preliminary IF amplifier;

a second tuned coupling network having a band-pass characteristic and interposed between an output terminal of said preliminary IF amplifier and an input terminal of said final IF amplifier; and an untuned coupling network having a wide-band low-pass characteristic and interposed between an output terminal of said final IF amplifier and said video detector; said preliminary IF amplifier, said final IF amplifier, said video detector, and said untuned coupling network appearing in integrated form on a common, monolithic integrated circuit chip.

9. Apparatus in accordance with claim 8 also including:

an automatic fine tuning circuit for modifying the operation of said tuner apparatus in response to an IF input signal; and means coupled to an output of said second tuned coupling network for deriving said IF input signal for said automatic fine tuning circuit from the IF signal output of said preliminary IF amplifier.

10. Apparatus in accordance with claim 9 wherein said IF input signal deriving means includes isolating means realized in integrated form on said common, monolithic integrated circuit chip.

11. In a television receiver including tuner apparatus for selecting and converting received television signals to intermediate frequencies, the combination comprising:

1. a monolithic integrated circuit chip having an array of chip terminals constituted by a plurality of conductive areas disposed about its periphery, said chip incorporating:
   a. a first amplifier section providing a direct current coupling between a first and a second of said array of chip terminals and disposed to develop at said second chip terminal an amplified version of signals appearing at said first chip terminal;
   b. a detector having an input electrode and an output electrode;
   c. means providing a direct current coupling between the output electrode of said detector and a third of said array of chip terminals; and
   d. a second amplifier section providing a direct current coupling between a fourth of said array of chip terminals and the input electrode of said detector and disposed to deliver to said detector an amplified version of signals appearing at said fourth chip terminal;
2. a first, off-chip, tuned coupling network having a band-pass characteristic;
3. means for interposing said first tuned coupling network between said tuner apparatus and said first chip terminal;
4. a second, off-chip, tuned coupling network having a band-pass characteristic;
5. means for interposing said second tuned coupling network between said second and fourth chip terminals; and
6. video signal utilization means coupled to said third chip terminal.

12. In a color television receiver including tuner apparatus for selecting and converting to intermediate frequencies received color television signals including a modulated picture carrier and an accompanying modulated sound carrier, said picture carrier being modulated by a luminance signal and a modulated color subcarrier, the combination comprising:

1. a monolithic integrated circuit chip having an array of chip terminals constituted by a plurality of conductive areas disposed about its periphery, said chip incorporating:
   a. a first amplifier section providing a direct current coupling between a first and a second of said array of chip terminals and disposed to develop at said second chip terminal an amplified version of signals appearing at said first chip terminal;
   b. a first detector having an input electrode and an output electrode;
   c. means providing a direct current coupling between the output electrode of said first detector and a third of said array of chip terminals;
   d. a second amplifier section providing a direct current coupling between a fourth of said array of chip terminals and the input electrode of said first detector and disposed to deliver to said first detector an amplified version of signals appearing at said fourth chip terminal;
   e. a second detector having an input electrode and an output electrode;
   f. a third amplifier section providing a direct current coupling between a fifth of said array of chip terminals and the input electrode of said second detector and disposed to deliver to said second detector an amplified version of signals appearing at said fifth chip terminals; and
   g. means providing a coupling between the output electrode of said second detector and a sixth of said array of chip terminals;
2. a first, off-chip, tuned coupling network having a band-pass characteristic;
3. means for interposing said first tuned coupling network between said tuner apparatus and said first chip terminal;
4. a second, off-chip, tuned coupling network having a band-pass characteristic;
5. means for interposing said second tuned coupling network between said second and fifth chip terminals;
6. a third, off-chip, tuned coupling network having a band-pass characteristic and incorporating a trap for said accompanying sound carrier;
7. means for interposing said third tuned coupling network between said fifth and fourth chip terminals;
8. sound signal utilization means coupled to said sixth chip terminal;
9. luminance signal utilization means coupled to said third chip terminal; and
10. modulated color subcarrier utilization means coupled to said third chip terminal.

13. Apparatus in accordance with claim 12 also including:

automatic fine tuning means for modifying the operation of said tuning apparatus in response to an IF input signal; and means coupled to an output of said third tuned coupling network for deriving said IF input signal for said automatic fine tuning means from the IF signal output of said first amplifier section.

14. Apparatus in accordance with claim 13 wherein said IF input signal deriving means includes isolating means incorporated in said monolithic integrated circuit chip and coupled between said fourth chip terminal and a seventh of said array of chip terminals.

15. A monolithic integrated circuit chip for use with a source of television IF signals and an off-chip tuned coupling network, said chip having an array of chip terminals, constituted by a plurality of conductive areas disposed about its periphery, for facilitating connection to off-chip components, said chip comprising the combination of:

a first voltage amplifier stage coupled between a first and a second of said array of chip terminals and disposed to develop at said second chip terminal an amplified version of signal voltages appearing at said first chip terminal;

a detector having an input electrode and an output electrode;

means providing a direct current coupling between the output electrode of said detector and a third of said array of chip terminals; and second and third voltage amplifier stages, direct current coupled in cascade, providing a direct current coupling between a fourth of said array of chip terminals and the input electrode of said detector and disposed to deliver to said detector an amplified version of signal voltages appearing at said fourth chip terminal; whereby coupling of said source to said first chip terminal and interposition of said tuned coupling network between said second and fourth chip terminals permits use of said chip for performing the functions of IF amplification and video detection with stability enhanced by the absence of high level IF signals from the array of chip terminals.

16. In a television receiver including a source of television IF signals, the combination comprising:

preliminary IF amplifier means responsive to signals from said source for developing a low-level IF signal output at an output terminal thereof;

tuned coupling means having a band-pass characteristic and responsive to the low-level IF signal output of said preliminary IF amplifier means for selectively coupling low-level IF signals from said preliminary IF amplifier means output terminal to a coupling means output terminal;

final IF amplifier means having an input terminal coupled to said coupling means output terminal for developing a high-level IF signal output at an output terminal thereof;

a video detector;

said preliminary IF amplifier means, said final IF amplifier means and said video detector all being realized in integrated form on a common, monolithic integrated circuit chip; and an on-chip direct coupling between said final IF amplifier means output terminal and said video detector for delivering said high level IF signal output to said video detector.

17. In a color television receiver including a source of color television IF signals comprising modulated picture and sound carriers, the combination comprising:

preliminary IF amplifier means responsive to signals from said source for developing a low-level IF signal output at an output terminal thereof;

tuned coupling means, having a band-pass characteristic and responsive to the low-level IF signal output at said preliminary IF amplifier means output terminal, for developing (*a*) a first low-level IF signal output, having a first picture carrier to sound carrier ratio, at a first output terminal thereof, and (*b*) a second low-level IF signal output, having a second picture carrier to sound carrier ratio appreciably greater than said first ratio, at a second output terminal thereof;

final IF amplifier means having an input terminal coupled to said second output terminal of said tuned coupling means for developing a first high-level IF signal output;

a video detector;

a color image reproducer responsive to the output of said video detector;

auxiliary IF amplifier means having an input terminal coupled to said first output terminal of said tuned coupling means for developing a second high-level IF signal output;

an intercarrier sound detector;

said preliminary, final and auxiliary IF amplifier means, said video detector and said intercarrier sound detector all being realized in integrated form on a single, monolithic integrated circuit chip;

an on-chip direct coupling between said final IF amplifier means and said video detector for delivering said first high-level IF signal output to said video detector; and an on-chip direct coupling between said auxiliary IF amplifier means and said intercarrier sound detector for delivering said second high-level IF signal output to said intercarrier sound detector.

UNITED STATES PATENT OFFICE
CERTIFICATE OF CORRECTION

Patent No. 3,564,125 Dated 2-16-71

Inventor(s) Jack Avins

It is certified that error appears in the above-identified patent and that said Letters Patent are hereby corrected as shown below:

Column 10 line 32 that portion reading "cascode" should read --cascade--.
Column 10 line 33 that portion reading "cascoded" should read --cascaded --.

Signed and sealed this 17th day of August 1971.

(SEAL)
Attest:

EDWARD M.FLETCHER,JR.
Attesting Officer

WILLIAM E. SCHUYLER, J
Commissioner of Patent